United States Patent
Saha et al.

(10) Patent No.: US 12,362,697 B2
(45) Date of Patent: Jul. 15, 2025

(54) ROTATING ELECTRICAL MACHINE CONTROL DEVICE

(71) Applicants: AISIN CORPORATION, Aichi (JP); TOYOTA JIDOSHA KABUSHIKI KAISHA, Toyota (JP)

(72) Inventors: Subrata Saha, Kariya (JP); Keisuke Nishimura, Kariya (JP); Kyohei Kawamura, Kariya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/266,997

(22) PCT Filed: Feb. 8, 2022

(86) PCT No.: PCT/JP2022/004839
§ 371 (c)(1),
(2) Date: Jun. 13, 2023

(87) PCT Pub. No.: WO2022/209315
PCT Pub. Date: Oct. 6, 2022

(65) Prior Publication Data
US 2024/0088816 A1    Mar. 14, 2024

(30) Foreign Application Priority Data

Mar. 30, 2021   (JP) ................. 2021-057743

(51) Int. Cl.
*H02P 27/08*    (2006.01)
(52) U.S. Cl.
CPC .................. *H02P 27/085* (2013.01)
(58) Field of Classification Search
CPC ..... H02P 27/08; H02P 27/085; H02P 2209/13
See application file for complete search history.

(56) References Cited

U.S. PATENT DOCUMENTS

| | | | |
|---|---|---|---|
| 7,095,197 B2* | 8/2006 | Benchaib | H02P 29/50 318/722 |
| 8,258,735 B2* | 9/2012 | Kitanaka | H02P 21/0089 318/400.3 |

(Continued)

FOREIGN PATENT DOCUMENTS

| JP | 2006-081287 A | 3/2006 |
|---|---|---|
| JP | 2017-005810 A | 1/2017 |

OTHER PUBLICATIONS

Apr. 19, 2022 International Search Report issued in International Patent Application No. PCT/JP2022/004839.

(Continued)

*Primary Examiner* — Rina I Duda
(74) *Attorney, Agent, or Firm* — Oliff PLC

(57) ABSTRACT

A rotating electrical machine control device shifts a control system to synchronous five-pulse control when an operating point crosses a second boundary from a state in which asynchronous pulse-width modulation control is being executed, and shifts the control system to the asynchronous pulse-width modulation control when the operating point crosses a first boundary from a state in which the synchronous five-pulse control is being executed. The first boundary is set such that the number of switching pulses per unit rotational speed by the synchronous five-pulse control immediately before the operating point crosses the first boundary is smaller than the number of the switching pulses per unit rotational speed by the asynchronous pulse-width modulation control immediately after the operating point crosses the first boundary.

6 Claims, 16 Drawing Sheets

(56) References Cited

U.S. PATENT DOCUMENTS

| | | | |
|---|---|---|---|
| 8,446,117 B2* | 5/2013 | Gallegos-Lopez | H02P 25/22 318/400.29 |
| 9,643,500 B2* | 5/2017 | Nishimura | B60L 3/0046 |
| 2006/0049792 A1 | 3/2006 | Chen et al. | |
| 2018/0337623 A1* | 11/2018 | Ota | H02M 7/5395 |
| 2019/0260636 A1* | 8/2019 | Sun | H04W 16/02 |

OTHER PUBLICATIONS

Aug. 19, 2024 extended Search Report issued in European Patent Application No. 22779544.0.

* cited by examiner

ROTATING ELECTRICAL MACHINE CONTROL DEVICE

TECHNICAL FIELD

The present invention relates to a rotating electrical machine control device that drives and controls a rotating electrical machine by performing switching control of a plurality of switching elements constituting an inverter that is connected to a DC power supply and is connected to the rotating electrical machine to convert power between DC and multiple-phase AC.

BACKGROUND ART

As disclosed in JP 2006-81287 A (Patent Literature 1), asynchronous modulation control that is not synchronized with rotation of a rotating electrical machine and synchronous modulation control that is synchronized with the rotation of the rotating electrical machine are known as control systems when the rotating electrical machine is driven and controlled via an inverter. Generally, the asynchronous modulation control is executed in an operation region where the rotational speed of the rotating electrical machine is low while the synchronous modulation control is executed in an operation region where the rotational speed is high. A typical example of the synchronous modulation control is one-pulse control (rectangular wave control) in which one pulse is output in one cycle of an electrical angle, and a typical example of the asynchronous modulation control is so-called pulse-width modulation control. When the control system is switched between the asynchronous pulse-width modulation control and the one-pulse control, a shock may be caused in the rotating electrical machine due to harmonic components included in the pulse in the one-pulse control. Therefore, when the control system is switched from the asynchronous pulse-width modulation control to the one-pulse control, the control system is switched to the one-pulse control through five-pulse control and three-pulse control in which harmonic components are fewer than in the one-pulse control. In this method, however, it is necessary to generate many modulation patterns, such as one pulse, three pulses, and five pulses, in the synchronous modulation control, and there is a possibility that the control becomes complicated and the cost of the rotating electrical machine control device may be increased.

Therefore, in Patent Literature 1, synchronous one-pulse control and synchronous five-pulse control are provided as the synchronous modulation control, and the rotating electrical machine control device is simplified. In combination with the asynchronous modulation control, the rotating electrical machine control device can switch the control system from the asynchronous modulation control to the synchronous one-pulse control through the synchronous five-pulse control, and can switch the control system from the synchronous one-pulse control to the asynchronous pulse-width modulation control through the synchronous five-pulse control.

CITATION LIST

Patent Literature

Patent Literature 1: JP 2006-81287 A

SUMMARY OF DISCLOSURE

Technical Problems

Here, a case, where the control system is switched between the asynchronous pulse-width modulation control and the synchronous five-pulse modulation control, will be considered. In the asynchronous pulse-width modulation control, a pulse is generated based on a carrier independent of the rotational speed of the rotating electrical machine. When it is assumed that n pulses are generated in one cycle of the electrical angle of the rotating electrical machine at a certain rotational speed and when the rotational speed is doubled, the one cycle of the electrical angle of the rotating electrical machine is halved, and thus the number of generated pulses is n/2. That is, the resolution of the carrier is lowered with respect to the electrical angle.

For example, while the rotating electrical machine is performing a regenerative operation, and when the rotational speed of the rotating electrical machine decreases and the control system is switched from the synchronous five-pulse control to the asynchronous pulse-width modulation control, pulses are generated in synchronization with the rotation of the rotating electrical machine in the synchronous five-pulse control, so that a sufficient number of pulses are generated per cycle of the electrical angle regardless of the rotational speed of the rotating electrical machine. On the other hand, when the control system is switched from the synchronous five-pulse control to the asynchronous pulse-width modulation control in a state in which the rotational speed of the rotating electrical machine is high, the resolution of the carrier in the asynchronous pulse-width modulation control becomes low as described above, and the number of pulses per cycle of the electrical angle may be smaller than in the synchronous five-pulse control.

Therefore, the balance of voltage is deteriorated, and distortion of current also increases, and for example, the overcurrent threshold of the inverter may be exceeded.

In view of the above background, it is desirable in the control of an inverter that converts power between DC and multiple-phase AC to provide, when the control system is switched between the asynchronous pulse-width modulation control and the synchronous five-pulse control, a technique capable of suppressing distortions of voltage and current to be small and smoothly switching the control system.

Solutions to Problems

In one aspect, a rotating electrical machine control device in view of the above, which drives and controls a rotating electrical machine by performing switching control of a plurality of switching elements constituting an inverter that is connected to a DC power supply and is connected to the rotating electrical machine to convert power between DC and multiple-phase AC, includes at least asynchronous pulse-width modulation control and synchronous five-pulse control as control systems of the inverter, the asynchronous pulse-width modulation control being a control system in which the switching elements are controlled by a plurality of switching pulses output based on a carrier that is not synchronized with rotation of the rotating electrical machine, the synchronous five-pulse control being a control system in which the switching elements are controlled by the switching pulses output five times in one cycle of an electrical angle in synchronization with the rotation of the rotating electrical machine, and, based on operation regions set by a relationship between torque and a rotational speed of the rotating electrical machine, the control system of the inverter being selected, in which: a five-pulse region, which is an operation region where the synchronous five-pulse control is selected, is set on a side where the rotational speed of the rotating electrical machine is higher and the torque is larger than in a PWM region, which is an operation recon where the asynchronous pulse-width modulation control is selected; a region boundary between the five-pulse region and the PWM region has a first boundary and a second boundary; the second boundary is set on a side where the rotational speed of the rotating electrical machine is higher and the torque is larger than al the first boundary; when an operating point defined by the relationship between the torque and rotational speed of the rotating electrical machine changes from a state in which the asynchronous pulse-width modulation control is being executed, and crosses the second boundary, the control system is shifted from the asynchronous pulse-width modulation control to the synchronous five-pulse control; when the operating point changes from a state in which the synchronous five-pulse control is being executed, and crosses the first boundary, the control system is shifted from the synchronous five-pulse control to the asynchronous pulse-width modulation control; the second boundary is se such that the number of the switching pulses per unit rotational speed by the asynchronous pulse-width modulation control immediately before the operating point crosses the second boundary is smaller than the number of the switching pulses per the unit rotational speed by the synchronous five-pulse control immediately after the operating point crosses the second boundary; and the first boundary is set such that the number of the switching pulses per the unit rotational speed by the synchronous five-pulse control immediately before the operating point crosses the first boundary is smaller than the number of the switching pulses per the unit rotational speed by the asynchronous pulse-width modulation control immediately after the operating point crosses the first boundary.

According to this configuration, by differentiating the second boundary, at which the control system is switched from the asynchronous pulse-width modulation control to the synchronous five-pulse control, from the first boundary, at which the control system is switched from the synchronous five-pulse control to the asynchronous pulse-width modulation control, it is possible to provide hysteresis between when the control system is switched at the second boundary and at the first boundary. Furthermore, this hysteresis makes it possible to reduce a difference in the number of the switching pulses per unit rotational speed before and after the control system is switched. As a result, distortion of AC current is suppressed. Specifically, the second boundary is set such that, when the operating point moves from the first boundary side to the second boundary side, the number of the switching pulses per unit rotational speed by the asynchronous pulse-width modulation control immediately before the operating point crosses the second boundary is smaller than the number of the switching pulses per unit rotational speed by the synchronous five-pulse control immediately after the operating point crosses the first boundary. That is, when the control system is switched, a state in which the number of pulses is small is changed to a state in which the number of pulses is large, so that stable switching is realized. In addition, the first boundary is set such that, when the operating point moves from the second boundary side to the first boundary side, the number of the switching pulses per unit rotational speed by the synchronous five-pulse control immediately before the operating point crosses the first boundary is smaller than the number of the switching pulses per unit rotational speed by the asynchronous pulse-width modulation control immediately after the operating point crosses the first boundary. As a result, when the control system is switched, a state in which the number of pulses is small is changed to a state in which the number of pulses is large, so that stable switching is realized. According to the present configuration, in the control of an inverter that converts power between DC and multiple-phase AC, it is possible, when the control system is switched between the asynchronous pulse-width modulation control and the synchronous five-pulse control, to suppress distortions of voltage and current to be small and smoothly switch the control system, as described above.

In another aspect, a rotating electrical machine control device, which drives and controls a rotating electrical machine by performing switching control of a plurality of switching elements constituting an inverter that is connected to a DC power supply and is connected to the rotating electrical machine to convert power between DC and multiple-phase AC, includes at least asynchronous pulse-width modulation control and synchronous five-pulse control as control systems of the inverter, the asynchronous pulse-width modulation control being a control system in which the switching elements are controlled by a plurality of switching pulses output based on a carrier that is not synchronized with rotation of the rotating electrical machine, the synchronous five-pulse control being a control system in which the switching elements are controlled by the switching pulses output five times in one cycle of an electrical angle in synchronization with the rotation of the rotating electrical machine, and, based on operation regions set by a relationship between torque and a rotational speed of the rotating electrical machine, the control system of the inverter being selected, in which: a five-pulse region, which is an operation region where the synchronous five-pulse control is selected, is set on a side where the rotational speed of the rotating electrical machine is higher and the torque is large than in a PWM region, which is an operation region where the asynchronous pulse-width modulation control is selected; the control system is switched for each phase of the multiple-phase AC at a region boundary between the five-pulse region and the PWM region: the asynchronous pulse-width modulation control and the synchronous five-pulse control at the region boundary are modulation systems including a fixed period in which the switching element is fixed to an on-state or an off-state for each phase of the multiple-phase AC; the control system is switched in the fixed period in the control system after being switched to or at a time point when a voltage waveform of each of the multiple-phase AC intersects with an amplitude center; and, in a case where the multiple phases are N (N is a natural number of 2 or more) phases, the control system in each phase is switched by differentiating by every $\pi/N$ or $2\pi/N$ in terms of the electrical angle, and the switching pulse is switched.

The asynchronous pulse-width modulation control is a modulation system that is not synchronized with the rotation of the rotating electrical machine, while the synchronous five-pulse control is a modulation system that is synchronized with the rotation of the rotating electrical machine. Therefore, the switching pulse by the asynchronous pulse-width modulation control and the switching pulse by the synchronous five-pulse control are not synchronized with each other. Therefore, when the control system is switched between both the controls, the switching pulse may be disconnected or the pulse-width may be greatly increased or decreased depending on a phase in which the switching occurs. Such a phenomenon may occur only in some phases, and in that case, the balance of the multiple-phase switching pulses may be lost, and as a result, the balance of the multiple-phase AC voltages or AC currents may be deteriorated. For example, when the switching pulse is switched in the fixed period, the current and voltage in the phase are relatively stable. When the rotating electrical machine control device switches the switching pulse at the timing as in the present configuration, distortion of current and voltage caused by the switching of the switching pulse are suppressed, and disturbance of the balance of the multiple-phase AC current or AC voltage is also suppressed. That is, according to the present configuration, in the control of an inverter that converts power between DC and multiple-phase AC, it is possible, when the control system is switched between the asynchronous pulse-width modulation control and the synchronous five-pulse control, to suppress distortions of voltage and current to be small and smoothly switch the control system.

Further features and advantages of the rotating electrical machine control device will become apparent from the following description, which is illustrative and non-limiting, of illustrative and non-limiting low embodiments, which will be described with reference to the drawings.

DESCRIPTION OF EMBODIMENTS

Figure 1:
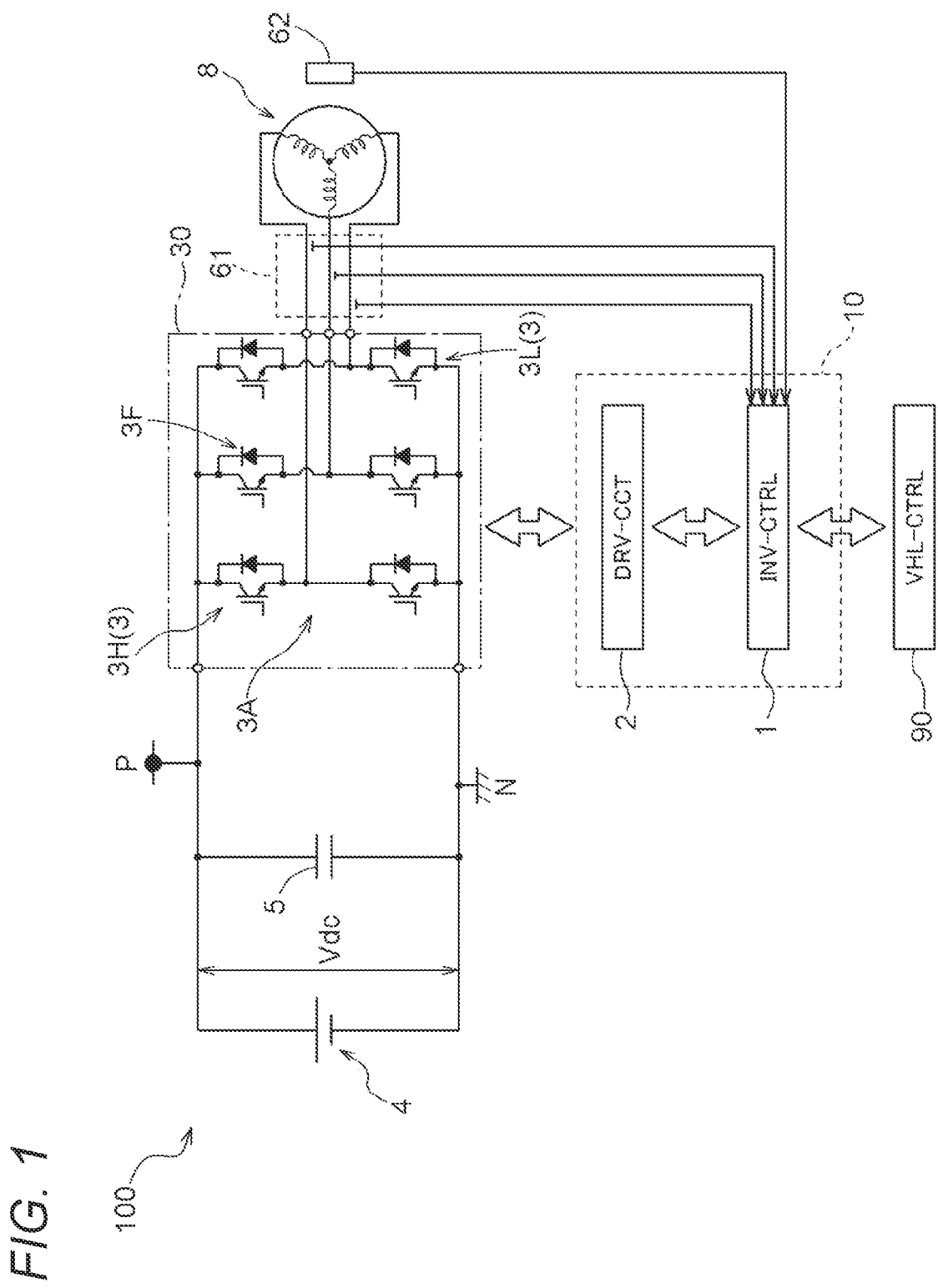
FIG. 1 is a schematic block diagram illustrating a configuration example of a rotating electrical machine control system including a rotating electrical machine control device.

Hereinafter, embodiments of the rotating electrical machine control device will be described with reference to the drawings. As illustrated in FIG. 1, a rotating electrical machine control system 100 includes a rotating electrical machine control device 10 and an inverter 30. The inverter 30 is connected to a DC power supply 4 (high-voltage DC power supply) and is connected to a rotating electrical machine 8 to convert power between DC and multiple-phase AC. In the present embodiment, the rotating electrical machine 8 is a three-phase AC type rotating electrical machine, and the inverter 30 converts power between DC and three-phase AC. The rotating electrical machine 8 is, for example, a driving power source for wheels in a vehicle such as an electric car or a hybrid car. In addition, the rotating electrical machine 8 has both functions of an electric motor that performs power running by being supplied with power from the DC power supply 4 and a generator that generates power by power from wheels or the like and regenerates power toward the DC power supply 4.

In a case where the rotating electrical machine 8 is a driving power source for the vehicle as described above, the power supply voltage of the DC power supply 4 is, for example, 200 to 400 [V]. Hereinafter, the voltage on the DC side of the inverter 30 (the voltage between a positive electrode P and a negative electrode N) is referred to as a DC link voltage. The DC power supply 4 is preferably constituted by a secondary battery (battery) such as a nickel hydrogen battery or a lithium ion battery, an electric double layer capacitor, or the like. A smoothing capacitor (DC link capacitor 5) that smooths the DC link voltage is provided on the DC side of the inverter 30. The DC link capacitor 5 stabilizes a DC voltage (DC link voltage Vdc) that fluctuates depending on the fluctuation in the power consumption of the rotating electrical machine 8.

As illustrated in FIG. 1, the inverter 30 includes a plurality of switching elements 3. As the switching element 3, it is preferable to apply a power semiconductor element such as an Insulated Gate Bipolar Transistor (IGBT), a power Metal Oxide Semiconductor Field Effect Transistor (MOSFET), a Silicon Carbide-Metal Oxide Semiconductor FET (SiC-MOSFET), a SiC-Static Induction Transistor (SiC-SIT), or a Gallium Nitride-MOSFET (GaN-MOSFET). In the present embodiment, a form, in which IGBTs are used as the switching elements 3, will be illustrated, as illustrated in FIG. 1 and the like. Each of the switching elements 3 includes a freewheel diode 3F in which a direction heading from the negative electrode N to the positive electrode P (a direction heading from a lower stage side to an upper stage side) is defined as a forward direction.

The inverter 30 includes a plurality of sets (here, three sets) of arms 3A for one AC phase constituted by a series circuit of an upper stage side switching element 3H and a lower stage side switching element 3L. In the present embodiment, a bridge circuit is formed in which one set of the series circuit (arm 3A) corresponds to each of stator coils corresponding to the U-phase, V-phase, and W-phase of the rotating electrical machine 8. A midpoint of the arm 3A, that is, a connection point between the upper stage side switching element 3H and the lower stage side switching element 3L is connected to each of the three-phase stator coils of the rotating electrical machine 8.

The rotating electrical machine control device 10 controls as a target the inverter 30 that is connected to the DC power supply 4 and is connected to the rotating electrical machine 8 to convert power between DC and multiple-phase AC, and includes an inverter control device 1 (INV-CTRL) that generates a switching control signal for each of the plurality of switching elements 3 constituting the inverter 30 to control the inverter 30, and a drive circuit 2 (DRV-CCT) that relays the plurality of switching control signals from the inverter control device 1 to the inverter 30.

The inverter 30 is controlled by the inverter control device 1. The inverter control device 1 is formed by using a logic processor, such as a microcomputer, as a core member. Actual current flowing through the stator coil of each phase of the rotating electrical machine 8 is detected by a current sensor 61, and the inverter control device 1 acquires a detection result thereof. A magnetic pole position and a rotational speed of the rotor of the rotating electrical machine 8 at each time point are detected by a rotation sensor such as a resolver 62, and the inverter control device 1 acquires a detection result thereof. The DC link voltage is detected by a non-illustrated voltage sensor or the like, and the inverter control device 1 acquires a detection result thereof. The DC link voltage is used for setting a modulation rate indicating a ratio of the effective value of AC power to DC power, and the like.

Figure 2:
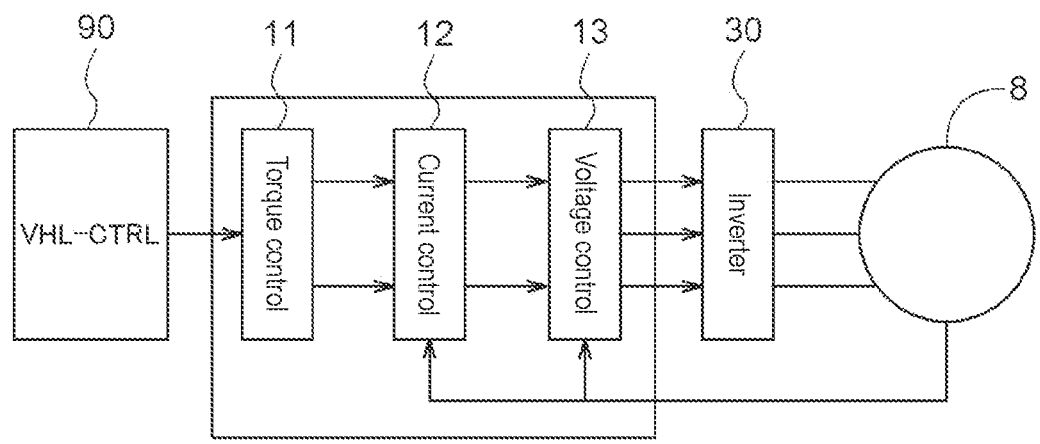
FIG. 2 is a simple and schematic block diagram of the rotating electrical machine control device by vector control.

Based on a target torque of the rotating electrical machine 8 provided from another control device such as a vehicle control device 90, the inverter control device 1 controls the rotating electrical machine 8 via the inverter 30 by performing current feedback control by, for example, a vector control method using the detection results of the current sensor 61 and the resolver 62. The inverter control device 1 includes various functional units for motor control, and each functional unit is realized by cooperation of hardware, such as a microcomputer, and software (program). As illustrated in FIG. 2, the rotating electrical machine control device 10 includes a torque control unit 11, a current control unit 12, and a voltage control unit 13.

The torque control unit 11 sets a current command on the basis of a required torque (torque command) provided from the vehicle control device 90. The current control unit 12 performs feedback control on the basis of a deviation between the detection result of the current sensor 61 and the current command, and calculates a voltage command. Based on the voltage command, the voltage control unit 13 generates the switching control signal for the switching element 3 of the inverter 30. Since the vector control and the current feedback control are known, detailed description thereof is omitted here.

The rotating electrical machine control device 10 can execute, for example, both pulse-width modulation (PWM) control in which a plurality of pulses having different patterns are output in one cycle of the electrical angle and rectangular wave control (one pulse control) (one Pulse)) in which one pulse is output in one cycle of the electrical angle as forms of switching patterns (forms of voltage waveform control) of the switching elements 3 constituting the inverter 30. That is, the rotating electrical machine control device 10 can execute the pulse-width modulation control and the rectangular wave control as the control systems of the inverter 30.

Examples of the pulse-width modulation include Continuous PWM (CPWM), such as Sinusoidal PWM (SPWM) and Space Vector PWM (SVPWM), and Discontinuous PWM (DPWM). Therefore, the pulse-width modulation control that can be executed by the rotating electrical machine control device 10 includes CPWM control and DPWM as the control system.

The CPWM is a modulation system in which the pulse-width modulation is continuously performed on all the multiple-phase arms 3A, and the DPWM is a modulation system in which the pulse-width modulation is performed including a period in which the switching element is fixed to an on-state or an off-state, on some of the multiple-phase arms 3A. Specifically, in the DPWM, for example, the signal level of the switching control signal of the inverter, corresponding to one phase of the three-phase AC power, is sequentially fixed, and the signal levels of the switching control signals corresponding to the other two phases are varied. In the CPWM, all the phases are modulated without fixing the switching control signal corresponding to any one of the phases, as described above. These modulation systems are determined according to operating conditions, such as rotational speed and torque required for the rotating electrical machine 8, and a modulation rate (a ratio of the effective value of a three-phase AC line voltage to a DC voltage) required to satisfy the operating conditions.

In the pulse-width modulation, a pulse is generated on the basis of a magnitude relationship between an amplitude of an AC waveform as a voltage command and an amplitude of a waveform of a triangular wave (including a sawtooth wave) carrier (CA). There is a case where a PWM waveform is directly generated by digital calculation without comparison with the carrier, but even in this case, the amplitude of the AC waveform as a command value and the amplitude of a virtual carrier waveform have a correlation.

In the pulse-width modulation by digital calculation, the carrier is determined according to a control cycle of the rotating electrical machine control device 10, such as the calculation cycle of a microcomputer or the operation cycle of an electronic circuit. That is, even when multiple-phase AC power is used to drive the AC rotating electrical machine 8, the carrier has a cycle (cycle that does not synchronize) that is not restrained by the rotational speed or the rotational angle (electrical angle) of the rotating electrical machine 8. Therefore, neither the carrier nor each pulse generated based on the carrier is synchronized with the rotation of the rotating electrical machine 8. Therefore, modulation systems, such as the SPWM and the SVPWM, may be referred to as asynchronous modulation. On the other hand, a modulation system, in which a pulse is generated in synchronization with the rotation of the rotating electrical machine 8, is referred to as synchronous modulation. For example, in the rectangular wave control (rectangular wave modulation), one pulse is output per cycle of the electrical angle of the rotating electrical machine 8, and thus the rectangular wave modulation is the synchronous modulation.

As described above, as an index indicating a conversion rate from DC voltage to AC voltage, there is a modulation rate indicating a ratio of the effective value of the line voltage of a multiple-phase AC voltage to a DC voltage. Generally, the maximum modulation rate of the SPWM is about 0.61 ($\approx$0.612), and the maximum modulation rate of the SVPWM control is about 0.71 ($\approx$0.707). A modulation system having a modulation rate exceeding about 0.71 is referred to as "overmodulation pulse-width modulation" as a modulation system having a higher modulation rate than usual. The maximum modulation rate of the "overmodulation pulse-width modulation" is about 0.78. This 0.78 is a physical (mathematical) limit in power conversion from DC to AC. When the modulation rate reaches 0.78 in the overmodulation pulse-width modulation, rectangular wave modulation (one pulse modulation) is obtained in which one pulse is output in one cycle of the electrical angle. In the rectangular wave modulation, the modulation rate is to be fixed to about 0.78 that is a physical limit.

The value of the modulation rate described here as an example is a physical (mathematical) value that does not take a dead time into consideration. Note that the dead time is a period when both switching control signals (switching pulses) for the upper stage side switching element 3H and lower stage side switching element 3L of the same arm 3A are in a non-effective state so as not to be simultaneously in an effective state that causes the switching element 3 to make a transition to an on-state. Therefore, in a case where the dead time is set, the actual modulation rate becomes low when modulation is simply performed by a switching control signal generated based on the voltage command corresponding to the command value of the modulation rate.

The overmodulation pulse-width modulation, having a modulation rate of less than 0.78, can also be realized by using any principle of a synchronous modulation system and an asynchronous modulation system. A typical modulation system of the overmodulation pulse-width modulation is the DPWM. The DPWM can also be realized by using any principle of a synchronous modulation system and an asynchronous modulation system. For example, when a synchronous modulation system is used, one pulse is output in one cycle of the electrical angle in the rectangular wave modulation, but in the DPWM, a plurality of pulses are output in one cycle of the electrical angle. When there are a plurality of pulses in one cycle of the electrical angle, an effective period of the pulse decreases accordingly, and thus the modulation rate decreases. Therefore, not only the modulation rate fixed to about 0.78 but also any modulation rate less than 0.78 can be realized by a synchronous modulation system. For example, multiple-pulse modulation (Multi-Pulses), such as nine-pulse modulation (nine Pulses) that outputs nine pulses in one cycle of the electrical angle and five-pulse modulation (five Pulses) that outputs five pulses, can also be used.

In the present embodiment, the rotating electrical machine control device 10 drives and controls the inverter 30 by the continuous pulse-width modulation (CPWM) by the above-described space vector pulse-width modulation (SVPWM), the discontinuous pulse-width modulation (DPWM), the five-pulse modulation (five Pulses), and the rectangular wave modulation (one Pulse). In the present embodiment, the DPWM adopts an asynchronous modulation system. A control system using the SVPWM (CPWM) is "asynchronous pulse-width modulation control", a control system using the five-pulse modulation is "synchronous five-pulse control", and a control system using the rectangular wave modulation is "synchronous one-pulse control (rectangular wave control)".

Figure 3:
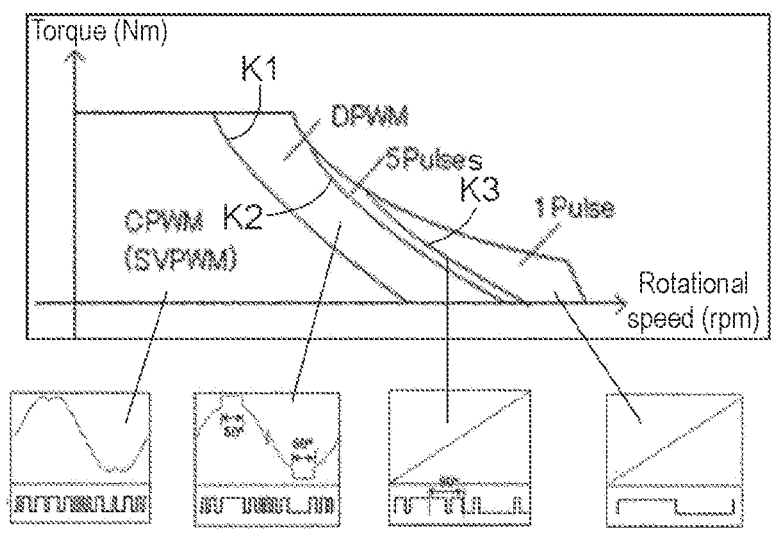
FIG. 3 is a view illustrating an example of operation regions and control systems of a rotating electrical machine.

FIG. 3 illustrates operation regions of the rotating electrical machine 8 indicated by the torque and the rotational speed. K1, K2, and K3 indicate region boundaries of the respective operation regions. In a region where the rotational speed is the lowest in a region where the rotational speed is lower than at a first region boundary K1, the continuous pulse-width modulation control (CPWM) of the asynchronous pulse-width modulation control is executed. In a region where the rotational speed is higher than at the first region boundary K1 and is lower than at a second region boundary K2, the DPWM control of the asynchronous pulse-width modulation control is executed. In a region where the rotational speed is higher than at the second region boundary K2 and is lower than at a third region boundary K3, the synchronous five-pulse control is executed. In a region where the rotational speed is the highest in a region w % here the rotational speed is higher than at the third region boundary K3, the synchronous one-pulse control is executed. The operation region on the lower rotational speed side than the second region boundary K2 is referred to as a "PWM region", and the operation region between the second region boundary K2 and the third region boundary K3 is referred to as a "five-pulse region".

FIG. 3 illustrates waveforms of the voltage command and waveforms of the switching control signal (switching pulse) for the asynchronous pulse modulation. The voltage command for the DPWM has a fixed period corresponding to 60° ($\pi/3$) of the phase. For the synchronous modulation, a voltage phase (0 to $2\pi$) and a waveform of the switching control signal (switching pulse) are illustrated.

As described above, the rotating electrical machine control device 10 drives and controls the rotating electrical machine 8 by performing switching control of the plurality of switching elements 3 constituting the inverter 30 that is connected to the DC power supply 4 and is connected to the rotating electrical machine 8 to convert power between DC and multiple-phase AC. The rotating electrical machine control device 10 includes at least the asynchronous pulse-width modulation control and the synchronous five-pulse control as the control systems of the inverter 30. As described above, the asynchronous pulse-width modulation control is a control system in which the switching elements 3 are controlled by a plurality of switching pulses output based on a carrier that is not synchronized with the rotation of the rotating electrical machine 8. The synchronous five-pulse control is a control system in which the switching elements 3 are controlled by five switching pulses output in one cycle of the electrical angle in synchronization with the rotation of the rotating electrical machine 8. Based on the operation regions set by the relationship between the torque and rotational speed of the rotating electrical machine 8, the rotating electrical machine control device 10 selects the control system of the inverter 30. The five-pulse region, which is an operation region where the synchronous five-pulse control is selected, is set on the side where the rotational speed and torque of the rotating electrical machine 8 are higher than in the PWM region, which is an operation region where the asynchronous pulse-width modulation control is selected.

Here, a case where the control system is switched between the asynchronous pulse-width modulation control and the synchronous five-pulse modulation control, that is, a case where the control system is switched at the second region boundary K2 will be considered. In the asynchronous pulse-width modulation control, a pulse is generated based on a carrier independent of the rotational speed of the rotating electrical machine 8. When it is assumed that, at a certain rotational speed, n pulses are generated in one cycle of the electrical angle of the rotating electrical machine 8, and when the rotational speed is doubled, one cycle of the electrical angle of the rotating electrical machine 8 is halved, and thus the number of generated pulses is n/2. That is, the resolution of the carrier is lowered with respect to the electrical angle.

Figure 5:
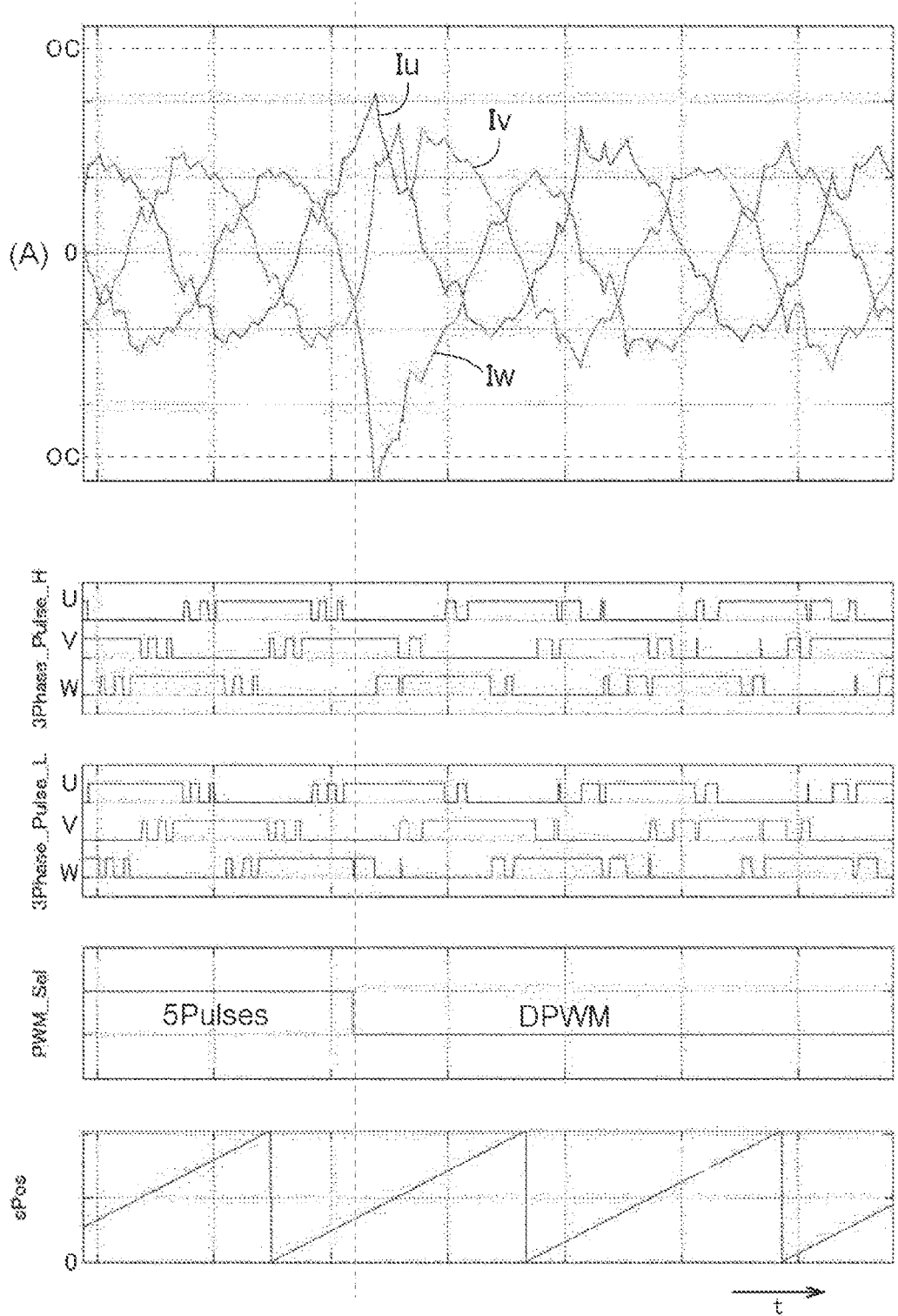
FIG. 5 is waveform charts (waveform examples when, during regeneration, a control system is switched from synchronous five-pulse control to asynchronous pulse-width modulation control at a first boundary according to the operation regions in FIG. 6 (comparative example with respect to FIG. 9)) illustrating an example in which a current waveform is disturbed when a control system is switched.

FIG. 5 illustrates waveform examples (regeneration/descent) while the rotating electrical machine 8 is performing a regenerative operation and when the rotational speed of the rotating electrical machine 8 decreases beyond the second region boundary K2 and thus the control system is switched from the synchronous five-pulse control to the asynchronous pulse-width modulation control. FIG. 5 illustrates, from the top: three-phase current waveforms (U-phase current Iu, V-phase current Iv, and W-phase current Iw); switching control signals (denoted by "3Phase_Pulse_H", U-phase, V-phase, and W-phase from the top, the same hereinafter) for the three-phase upper stage side switching element 3H; switching control signals (3Phase_Pulse_L) for the three-phase lower stage side switching element 3L; a switching signal (denoted by "PWM_sel", the synchronous five-pulse control by "Hi" and the asynchronous pulse-width modulation control by "Low", the same hereinafter) of the control system; and a voltage phase (denoted by "sPos", the same hereinafter) of the synchronous control. All the horizontal axes represent time (t). Since pulses are generated in synchronization with the rotation of the rotating electrical machine 8 immediately before the control system is switched, a sufficient number of pulses are generated per cycle of the electrical angle, as illustrated in FIG. 5. On the other hand, the resolution of the carrier is low immediately after the control system is switched to the asynchronous pulse-width modulation control, as described above, and thus the number of pulses per cycle of the electrical angle in the asynchronous pulse-width modulation control is smaller than in the synchronous five-pulse control. Therefore, the balance of voltage is deteriorated, and as illustrated in FIG. 5, distortion of the three-phase current immediately after the control system is switched increases. In this example, the W-phase current Iw exceeds an overcurrent threshold OC.

Figure 4:
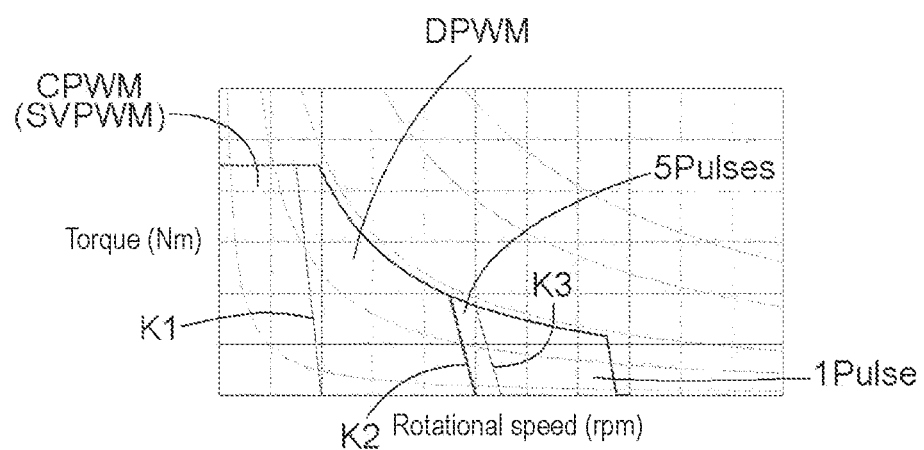
FIG. 4 is a view illustrating a comparative example of operation regions and control systems of a rotating electrical machine.

Nowadays, there is a strong demand for miniaturization of a rotating electrical machine serving as a driving force source of wheels in electric vehicles or hybrid vehicles. In a case where the rotating electrical machine is miniaturized, it is more necessary to drive the rotating electrical machine at a higher rotational speed. In addition, a high torque output is required even at a higher rotational speed. FIG. 4 illustrates operation regions of a conventional rotating electrical machine as a comparative example. Comparison between FIG. 3 and FIG. 4 shows that, for example, the torque in the operation region where the second region boundary K2 is set is much lower in FIG. 4 than in FIG. 3. That is, rotating electrical machines have recently been required to be driven at a higher rotational speed and a higher torque, and accordingly the current also increases, and thus the above-described problem is likely to occur.

Figure 7:
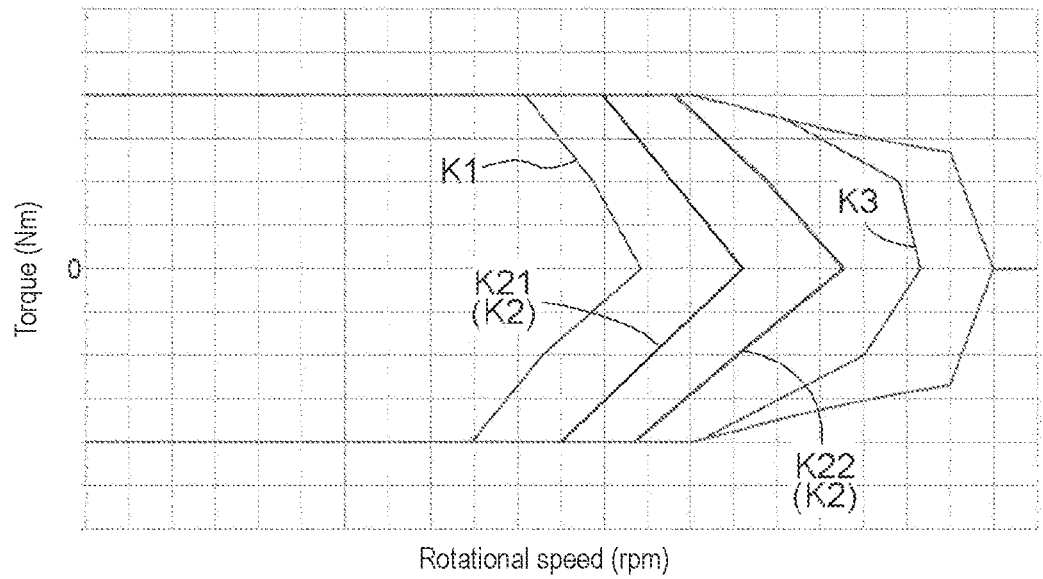
FIG. 7 is a view illustrating an example of the operation regions of the rotating electrical machine.

Therefore, in the present embodiment, the second region boundary K2, which is a region boundary between the five-pulse region and the PWM region, has a first boundary K21 and a second boundary K22, as illustrated in FIG. 7. The second boundary K22 is set on a side where the rotational speed of the rotating electrical machine 8 is higher and the torque is larger than at the first boundary K21. When an operating point, determined by the relationship between the torque and rotational speed of the rotating electrical machine 8, changes from a state, in which the operating point is located in the PWM region and the asynchronous pulse-width modulation control is being executed, and crosses the second boundary K22, the rotating electrical machine control device 10 shifts the control system from the asynchronous pulse-width modulation control to the synchronous five-pulse control. In addition, when the operating point changes from a state, in which the operating point is located in the five-pulse region and the synchronous five-pulse control is being executed, and crosses the first boundary K21, the rotating electrical machine control device 10 shifts the control system from the synchronous five-pulse control to the asynchronous pulse-width modulation control. That is, hysteresis is provided when the control system is switched at the second region boundary K2.

Figure 6:
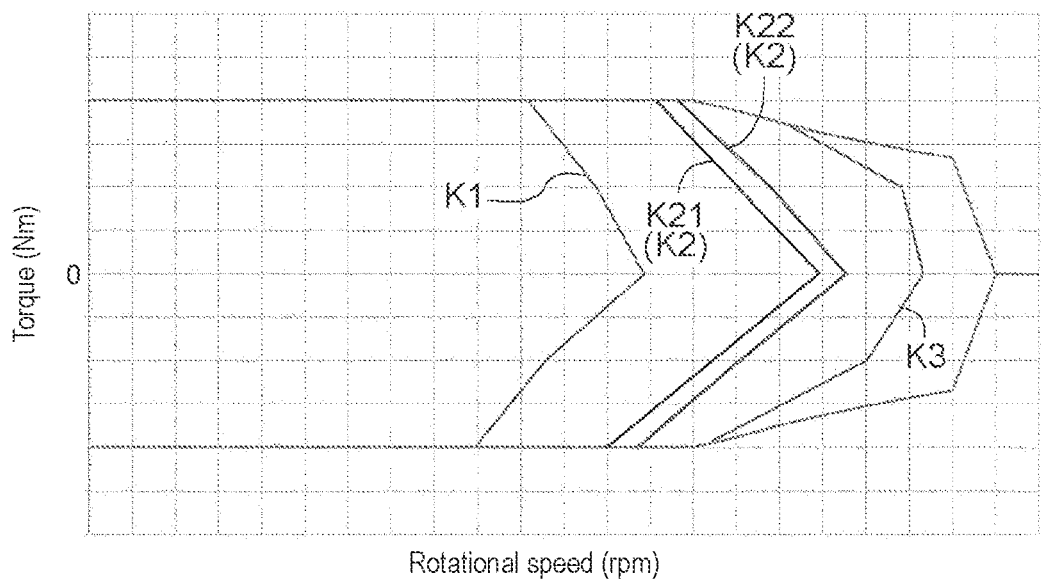
FIG. 6 is a view illustrating a conventional example of the operation regions of the rotating electrical machine.
Figure 8:
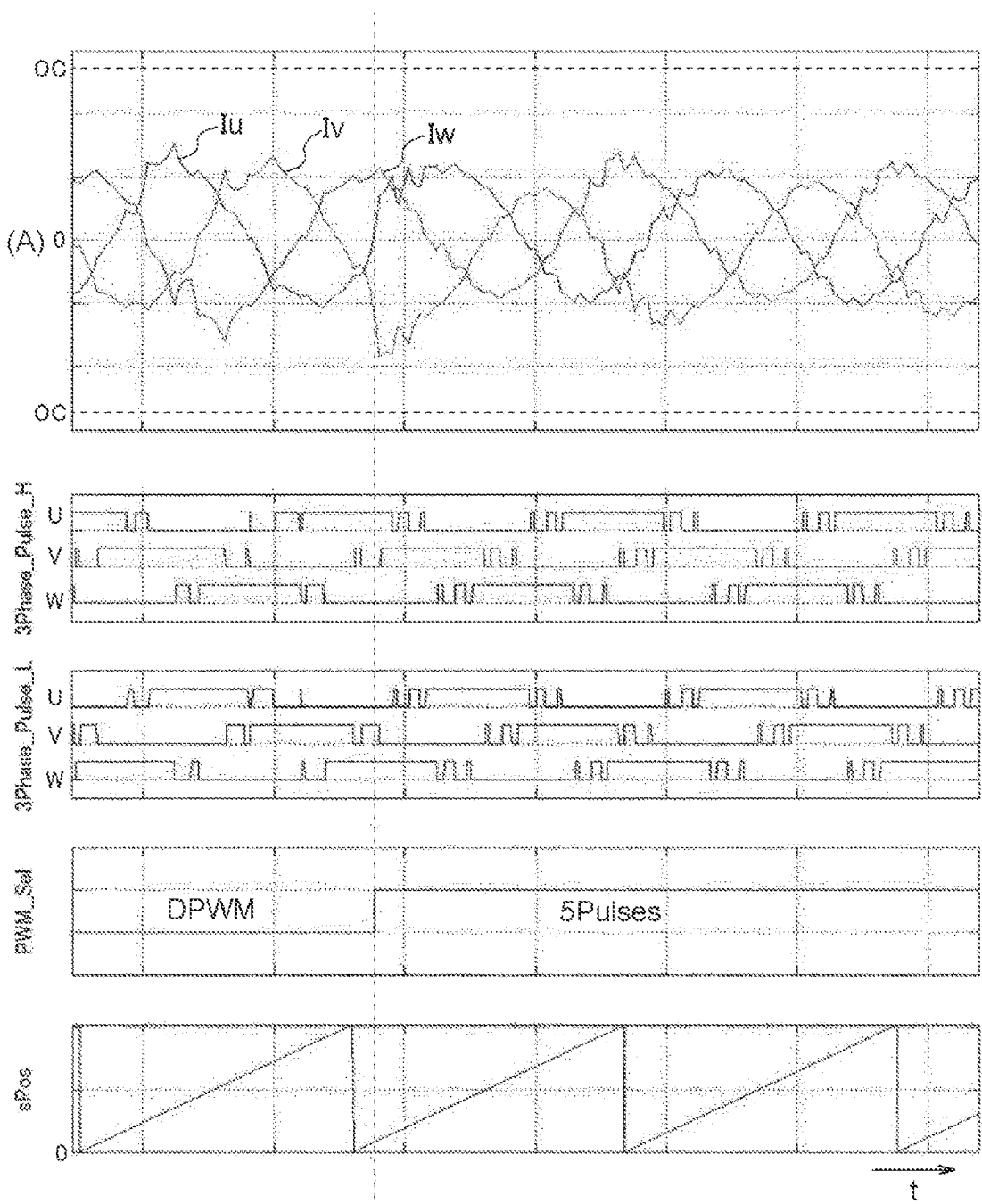
FIG. 8 illustrates waveform examples when, during regeneration, the control system is switched from the asynchronous pulse-width modulation control to the synchronous five-pulse control at a second boundary according to the operation regions in FIG. 6.

FIG. 6 illustrates a conventional example of the operation regions of the rotating electrical machine 8, and FIG. 7 illustrates an example of the operation regions of the rotating electrical machine 8 according to the present embodiment. In both FIGS. 6 and 7, the second region boundary K2 is set to also have hysteresis. However, the hysteresis in the conventional operation regions (FIG. 6) is smaller than in the operation regions of the present embodiment (FIG. 7). FIG. 8 illustrates waveform examples (regeneration/ascent) when the rotational speed of the rotating electrical machine 8 increases during the regenerative operation and the control system is switched from the asynchronous pulse-width modulation control to the synchronous five-pulse control at the second boundary K22 according to the operation regions in FIG. 6. In addition, FIG. 5 referred to above corresponds to waveform examples when, during regeneration, the control system is switched from the synchronous five-pulse control to the asynchronous pulse-width modulation control at the first boundary K21 according to the operation regions in FIG. 6.

In each of the examples illustrated in FIGS. 5 and 8, the discontinuous pulse-width modulation (DPWM) is executed up to a high rotation range, and the number of pulses decreases. In the case of the ascent as illustrated in FIG. 8, however, the number of pulses increases when the rotational speed increases and crosses the second boundary K22. That is, the number of pulses increases when a transition is made from the asynchronous pulse-width modulation control to the synchronous five-pulse control. When the number of pulses increases, distortion of the AC voltage is reduced and, and distortion of the AC current is also reduced. As a result, even when the control system is switched, overcurrent or the like is less likely to occur. In this case, distortion of the AC voltage is not large and distortion of the AC current is also not large when the control system is switched, as illustrated in FIG. 8 (although details will be described later, they are smaller than in the example of FIG. 5). Therefore, the possibility that, when the control system is switched, overcurrent or the like may occur is also reduced. As illustrated in FIG. 8, all of the U-phase current Iu, the V-phase current Iv, and the W-phase current Iw are less than the overcurrent threshold OC, and no overcurrent state occurs. The second boundary K22 in FIG. 6 corresponds to an operating point corresponding to, for example, a modulation rate of 0.7455.

In other words, the second boundary K22 is set such that, when the operating point moves from the first boundary K21 side to the second boundary K22 side, the number of the switching pulses per unit rotational speed by the asynchronous pulse-width modulation control immediately before the operating point crosses the second boundary K22 is smaller than the number of the switching pulses per unit rotational speed by the synchronous five-pulse control immediately after the operating point crosses the second boundary K22. That is, when the control system is switched, a state in which the number of pulses is small is changed to a state in which the number of pulses is large, so that stable switching is realized.

On the other hand, in the case of descent, the number of pulses decreases when the rotational speed decreases and crosses the first boundary K21, as illustrated in FIG. 5. That is, when a transition is made from the synchronous five-pulse control to the asynchronous pulse-width modulation control, the number of pulses decreases. When the number of pulses decreases, distortion of the AC voltage increases and distortion of the AC current also increases. As a result, when the control system is switched, overcurrent or the like is more likely to occur. FIG. 5 illustrates a case where the W-phase current is equal to or larger than the overcurrent threshold OC and an overcurrent state occurs. The first boundary K21 in FIG. 6 corresponds to an operating point corresponding to, for example, a modulation rate of 0.7055.

Figure 9:
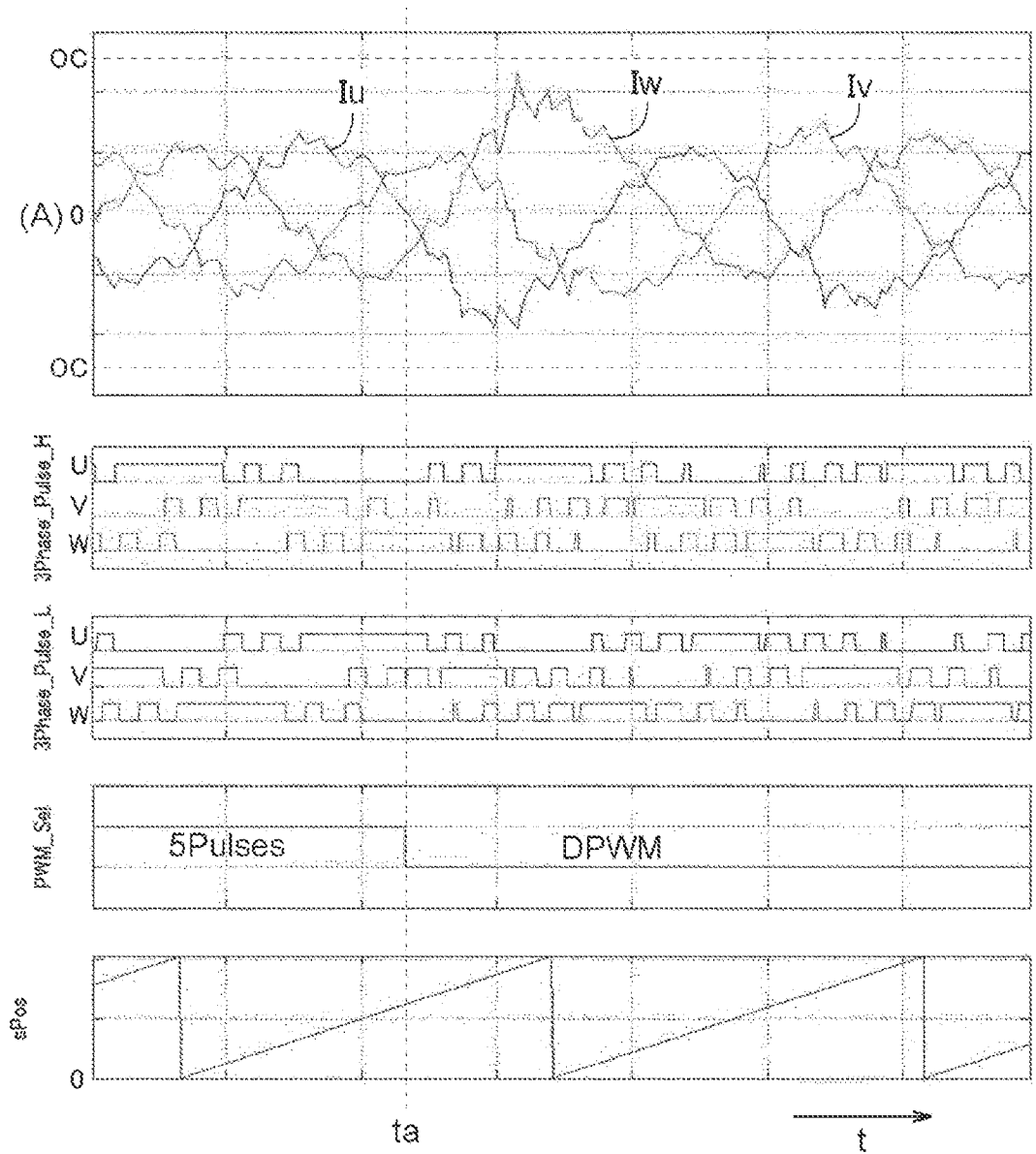
FIG. 9 is waveform examples when, during regeneration, the control system is switched from the synchronous five-pulse control to the asynchronous pulse-width modulation control at the first boundary according to the operation regions in FIG. 7 (waveform charts illustrating an example when three-phase switching pulses are simultaneously switched (a comparative example with respect to FIG. 23)).

In order to cope with this problem in the descent, the first boundary K21 is moved to a lower rotational speed side in the present embodiment, as illustrated in FIG. 7 (the second boundary K22 is the same as in FIG. 6). That is, the synchronous five-pulse control is executed up to an operation region where the rotational speed is lower, thereby suppressing the occurrence of distortions of the AC voltage and the AC current due to a decrease in the number of pulses. When the first boundary K21 moves to a lower rotational speed side, the number of pulses increases when the control system is switched to the asynchronous pulse-width modulation control (see FIG. 9). FIG. 9 is waveform examples when, according to the division (first boundary K21) of the control regions illustrated in FIG. 7, the control system is switched from the synchronous five-pulse control to the asynchronous pulse-width modulation control at the first boundary K21. Since a sudden decrease in the number of pulses, when the control system is switched, is suppressed, distortions possibly occurring in the AC voltage and the AC current are also suppressed as illustrated in FIG. 9. None of the U-phase current Iu, the V-phase current Iv, and the W-phase current Iw exceed the overcurrent threshold OC. In the present embodiment, the first boundary K21 in FIG. 7 corresponds to an operating point corresponding to, for example, a modulation rate of 0.55.

In other words, the first boundary K21 is set such that, when the operating point moves from the second boundary K22 side to the first boundary K21 side, the number of the switching pulses per unit rotational speed by the synchronous five-pulse control immediately before the operating point crosses the first boundary K21 is smaller than the number of the switching pulses per unit rotational speed by the asynchronous pulse-width modulation control immediately after the operating point crosses the first boundary K21. As a result, when the control system is switched, a state in which the number of pulses is small is changed to a state in which the number of pulses is large, so that stable switching is realized. Here, the problems during regeneration and improvement ideas thereof have been described, but a similar phenomenon also occurs during power running. Then, even during power running, the problems can be improved by the same measures.

According to experiments and simulations by the inventors, it has been found that the second region boundary K2, particularly the first boundary K21, are preferably set according to the DC link voltage Vdc. The improvement as described above with reference to FIGS. 5, 6, 7, and 9 is performed by taking a case, where the DC link voltage Vdc is relatively high (e.g., 700 [V] or more), as an example. In the case of this voltage, the maximum current of the three-phase current is suppressed to be relatively small, but when the DC link voltage Vdc decreases, the rotational speed, when the control system is switched, decreases, and the synchronous five-pulse control is executed at lower rotation. Therefore, the maximum current increases in the steady state of the synchronous five-pulse control.

Figure 10:
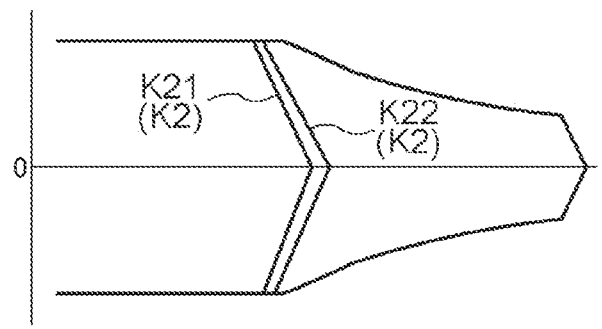
FIG. 10 is a view illustrating an example of control regions when a DC link voltage is relatively low.
Figure 11:
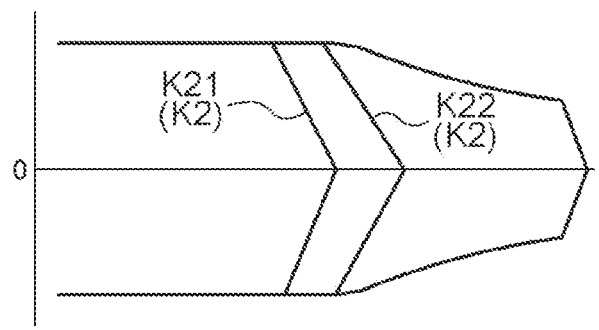
FIG. 11 is a view illustrating an example of the control regions when the DC link voltage is higher than in the example of FIG. 10.
Figure 12:
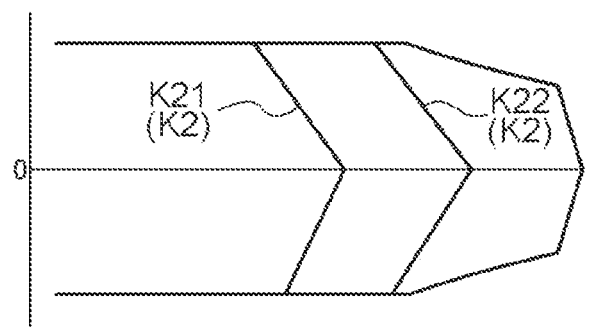
FIG. 12 is a view illustrating an example of the control regions when the DC link voltage is higher than in the example of FIG. 11.

Therefore, in the present embodiment, the second region boundary K2, particularly the first boundary K21, are set according to the DC link voltage Vdc. FIGS. 10 to 12 illustrate control regions when the DC link voltages Vdc are different from each other. Among these three views, FIG. 10 illustrates an example of control regions when the DC link voltage Vdc is relatively low (e.g., about 500 [V]), FIG. 11 illustrates an example of control regions when the DC link voltage Vdc is higher (e.g., about 600 [V]) than in the example of FIG. 10, and FIG. 12 illustrates an example of control regions when the DC link voltage Vdc is further higher (e.g., about 700 [V]) than in the example of FIG. 11.

As illustrated in FIGS. 10 to 12, the first boundary K21 and the second boundary K22 are set such that, as the DC link voltage Vdc, which is a voltage on the DC side of the inverter 30, becomes higher, the interval between the first boundary K21 and the second boundary K22 becomes longer. In the present embodiment, the modulation rates at the second boundary K22 are equal, and the modulation rates at the first boundary K21 becomes higher as the DC link voltage Vdc becomes lower, as will be described later, and thus the first boundary K21 draws near the second boundary K22 side, and the interval therebetween is narrowed. By moving the first boundary K21 in this manner, the rotational speed of the rotating electrical machine 8, when the control system is switched from the synchronous five-pulse control to the asynchronous pulse-width modulation control, becomes substantially constant even if the DC link voltage Vdc is different, and an increase in current in a steady state of the synchronous five-pulse control is suppressed.

In the present embodiment, the modulation rate at the second boundary K22 is, for example, 0.7455 in common among FIGS. 10 to 12. The modulation rate at the first boundary K21 in FIG. 10 is, for example, 0.7 in common between during power running and during regeneration. The modulation rate at the first boundary K21 in FIG. 11 is, for example, 0.6 in common between during power running and during regeneration. The modulation rate at the first boundary K21 in FIG. 12 is, for example, 0.55 during power running and, for example, 0.5 during regeneration. These modulation rates are examples for indicating differences in relative modulation rates, and do not limit the present embodiment.

As a matter of course, both the first boundary K21 and the second boundary K22 may be changed according to the DC link voltage Vdc. Furthermore, as a matter of course, the first boundary K21 and the second boundary K22 may be fixed regardless of the DC link voltage Vdc in a case where there is no problem with the increase in current as described above.

Figure 13:
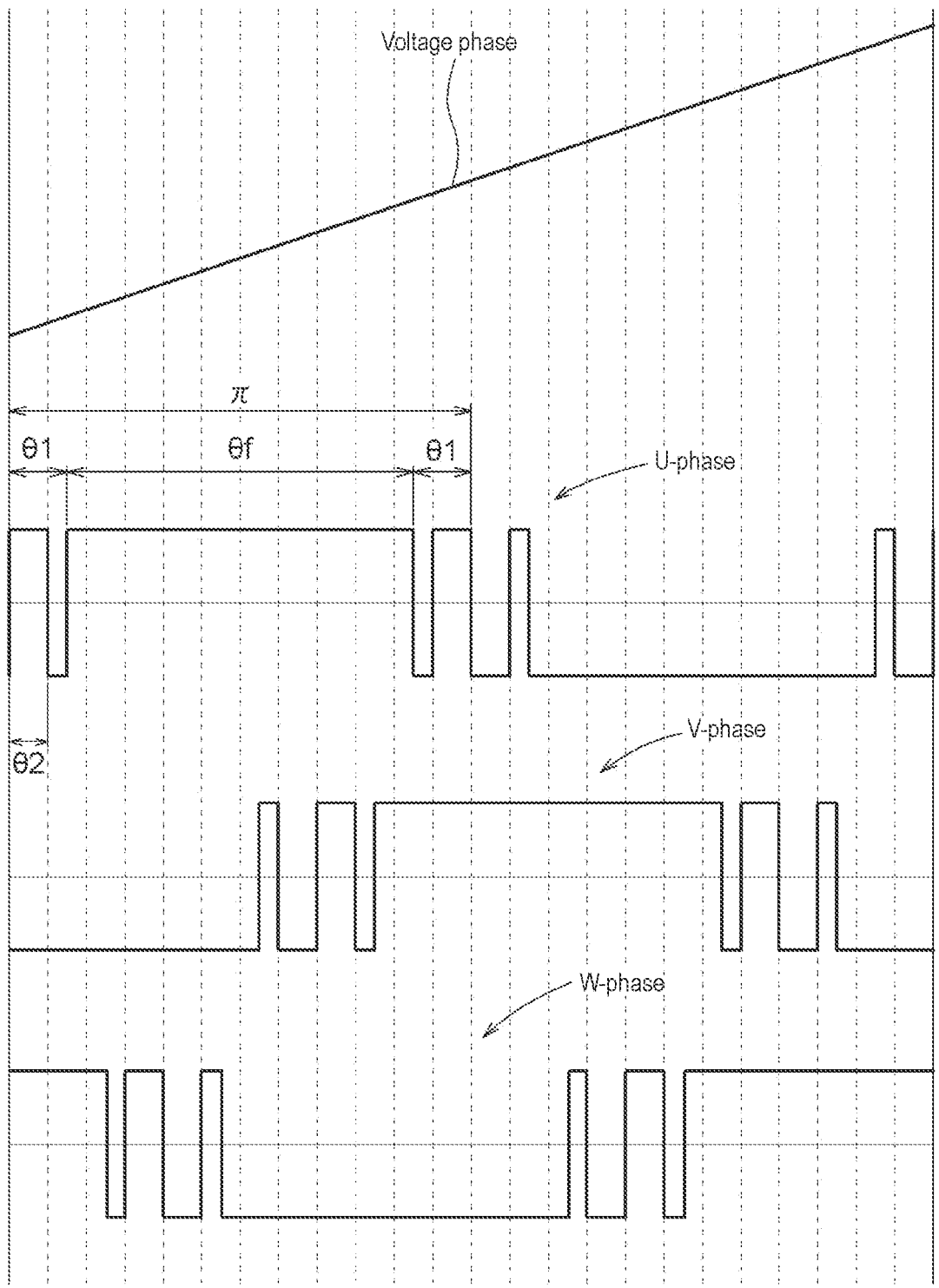
FIG. 13 is a view illustrating an example of switching pulses in the synchronous five-pulse control.

When the application range of the synchronous five-pulse control is expanded to a lower modulation rate as described above, there is a possibility that the conventional pulse generation algorithm cannot cope with this. FIG. 13 illustrates an example of the switching pulses in the synchronous five-pulse control. FIG. 13 illustrates one cycle of the electrical angle in the synchronous modulation. The upper view illustrates a range of "0" to "2π" of a voltage phase (corresponding to "sPos" in FIGS. 5, 8 to 10, etc.) of the synchronous control. Subsequently, an example of a U-phase switching pulse, an example of a V-phase switching pulse, and an example of a W-phase switching pulse are illustrated. In this algorithm. "⅔π" of the half cycle "π" of the voltage phase is set as a fixed period θf. A first period θ1 (=⅙π(=30 [deg])) is set at two places in the remaining period except for the fixed period θf in the half cycle of the voltage phase. A second period θ2 is a phase for determining a duty in the synchronous five-pulse control, and is set in each of the first periods θ1.

For example, when the application range of the synchronous five-pulse modulation is extended to a modulation rate of about 0.5, as described above, it is necessary to make the fixed period θf smaller than "⅔π". Since the modulation rate by the synchronous five-pulse control can be determined by the first period θ1 and the second period θ2 (the fixed period θf also changes depending on the first period θ1), the first period θ1 and the second period θ2 are determined as follows.

First, assuming that the modulation rate is "Midx=0.5" and while the first period θ1 is changed between "0 to π/3 (=60 [deg])", the second period θ2 is calculated based on the following equation (1).

[Mathematical equation 1]

$$\theta 2 = \cos^{-2}\left\{\frac{1}{2} + \cos\theta 1 - \left(\frac{\pi \cdot Midx}{2\sqrt{6}}\right)\right\} \quad (1)$$

In the synchronous five-pulse control, switching pulses are generated while high-order harmonic components are suppressed. Therefore, fifth-order, seventh-order, 11th-order, and 13th-order harmonic components "$a_n$" are calculated from the following equation (2) using the values of the first period θ1 and the second period θ2 calculated by the equation (1). In the following equation (2), "n" indicates the order of a harmonic component.

[Mathematical equation 2]

$$a_n = \left(\frac{4}{n\pi}\right)[1 - 2\cos(n\theta 2) + 2\cos(n\theta 1)] \quad (2)$$

Next, a harmonic factor "$Dis_{fac}$" is calculated from the harmonic components determined by the equation (2).

[Mathematical equation 3]

$$Dis_{fac} = \sqrt{\left(\frac{a_5}{5}\right)^2 + \left(\frac{a_7}{7}\right)^2 + \left(\frac{a_{11}}{11}\right)^2 + \left(\frac{a_{13}}{13}\right)^2} \quad (3)$$

Figure 14:
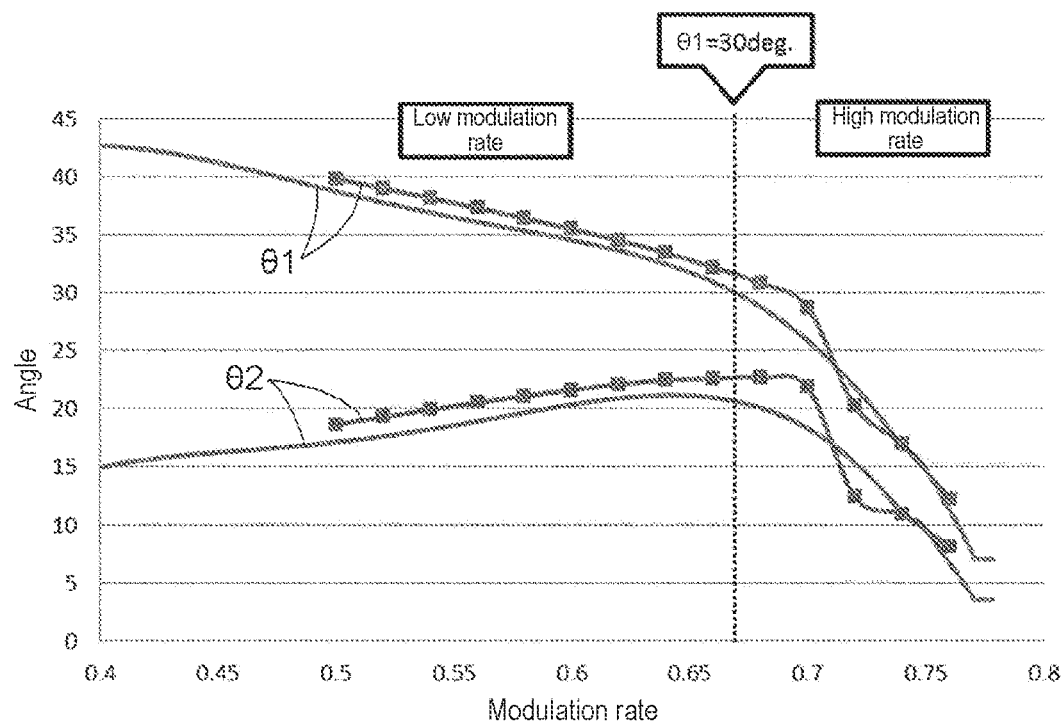
FIG. 14 is a graph showing relationships between parameters defining switching pulses in the synchronous five-pulse control and a modulation rate.

FIG. 14 illustrates relationships between parameters (θ1, θ2) defining the switching pulses in the synchronous five-pulse control and a modulation rate. In FIG. 14, plot points indicate the values of θ1 and θ2 determined based on the equation (1). Curves without plot points are characteristic curves obtained by multiplying the approximate curves obtained by connecting the plot points by filters based on the factors determined by the equation (3). By creating a map from these characteristic curves, switching pulses in the synchronous five-pulse control can be generated.

Figure 15:
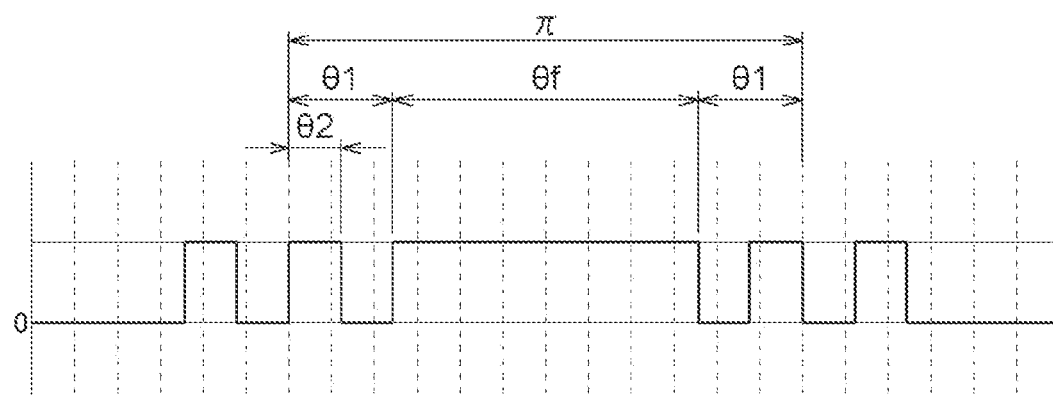
FIG. 15 is a chart showing an example of a switching pulse in the synchronous five-pulse control in which a range of an applicable modulation rate is extended.

At a high modulation rate of 0.7 or more, which is a so-called overmodulation region, the first period θ1 is "π/6" (=30 [deg]) or less as is clear from FIG. 14. Therefore, "⅔π" (=120 [deg]) of the half cycle "π" of the voltage phase can be set as the fixed period θf, as illustrated in FIG. 13. However, when the synchronous five-pulse control is performed up to a lower modulation rate, as described above, it is necessary to shorten the fixed period θf. For example, by setting the fixed period θf to "π/2" (=90 [deg]), the first period θ1 can be set up to "π/4" (=90 [deg]), and the synchronous five-pulse modulation can be applied up to a modulation rate of about 0.4. FIG. 15 illustrates an example of the switching pulse in the synchronous five-pulse control in which the range of an applicable modulation rate is extended in this way. In the present embodiment, the switching pulse by the synchronous five-pulse control is generated with the first period θ1 set to "π/4" (=90 [deg]), as illustrated in FIG. 15.

Figure 16:
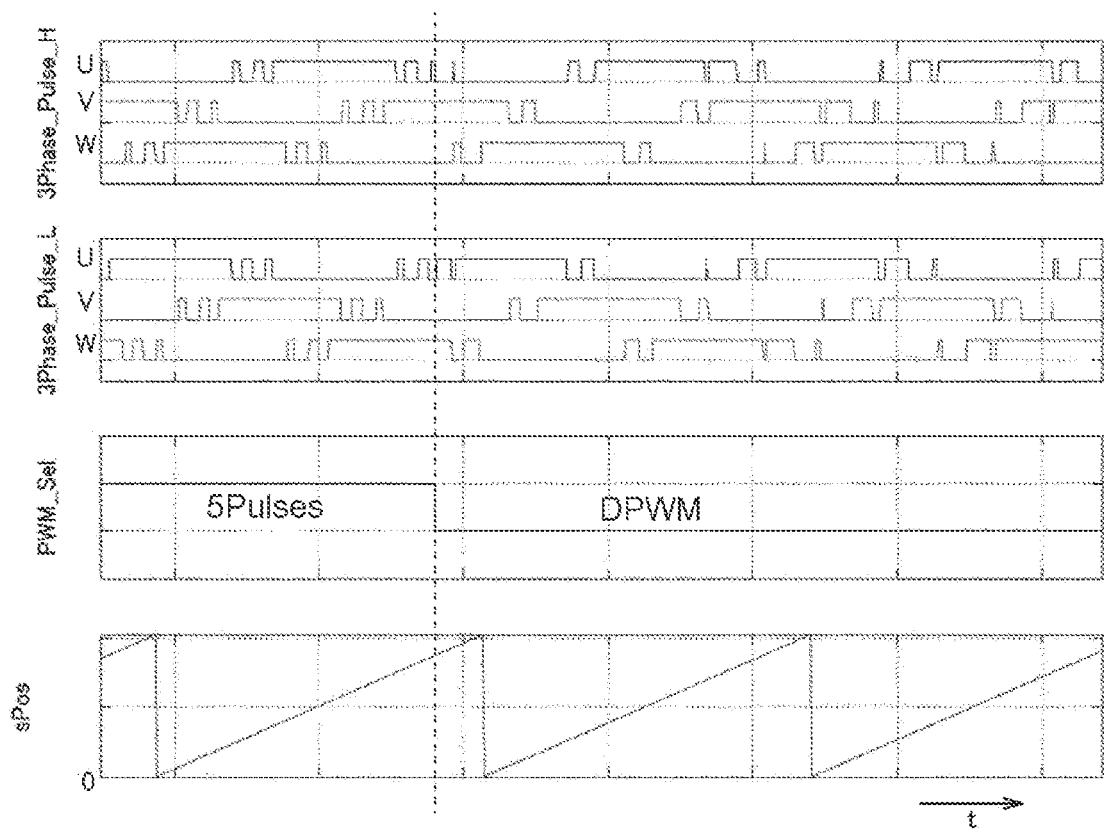
FIG. 16 is waveform charts showing examples of switching pulses when the control system is switched from the synchronous five-pulse control to the asynchronous pulse-width modulation (discontinuous pulse-width modulation) at a relatively high modulation rate (modulation rate higher than in FIG. 17 to be compared).
Figure 17:
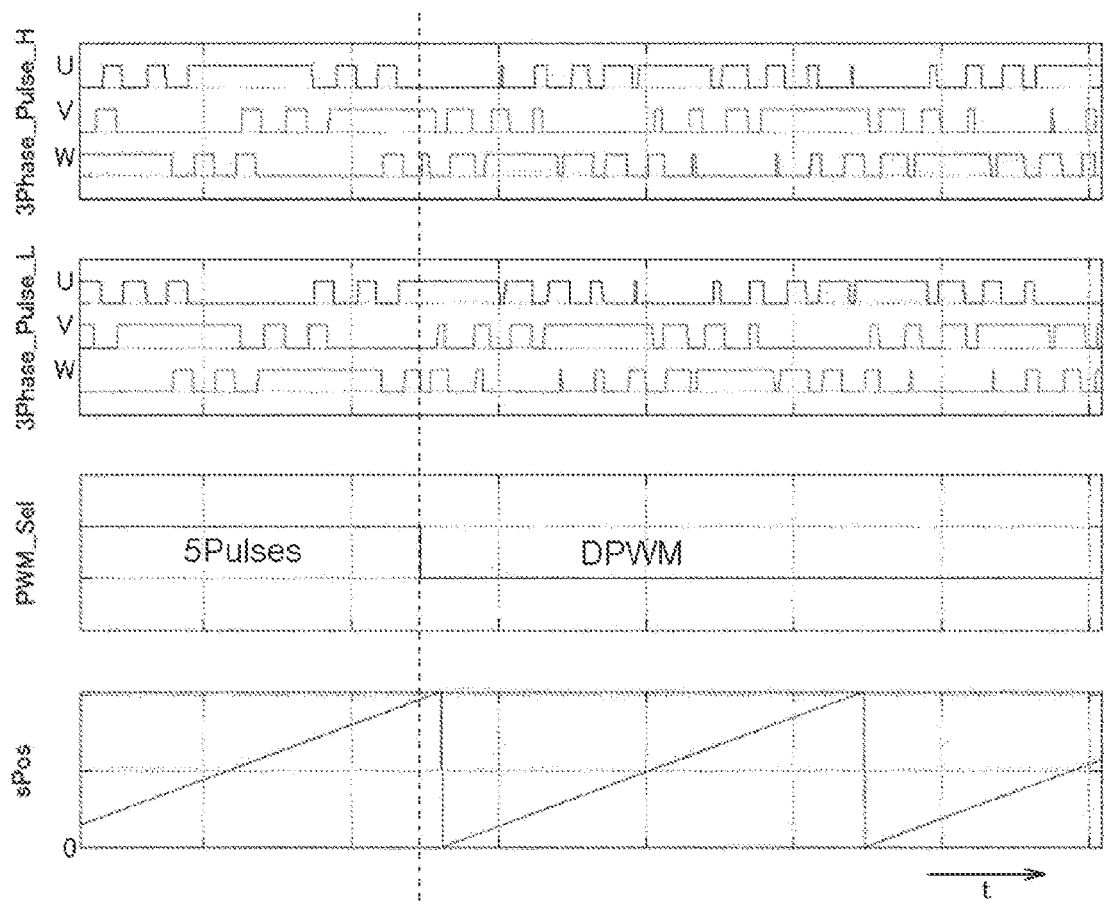
FIG. 17 is waveform charts showing examples of switching pulses when the control system is switched from the synchronous five-pulse control to the asynchronous pulse-width modulation (discontinuous pulse-width modulation) at a relatively low modulation rate (modulation rate lower than in FIG. 16 to be compared).
Figure 18:
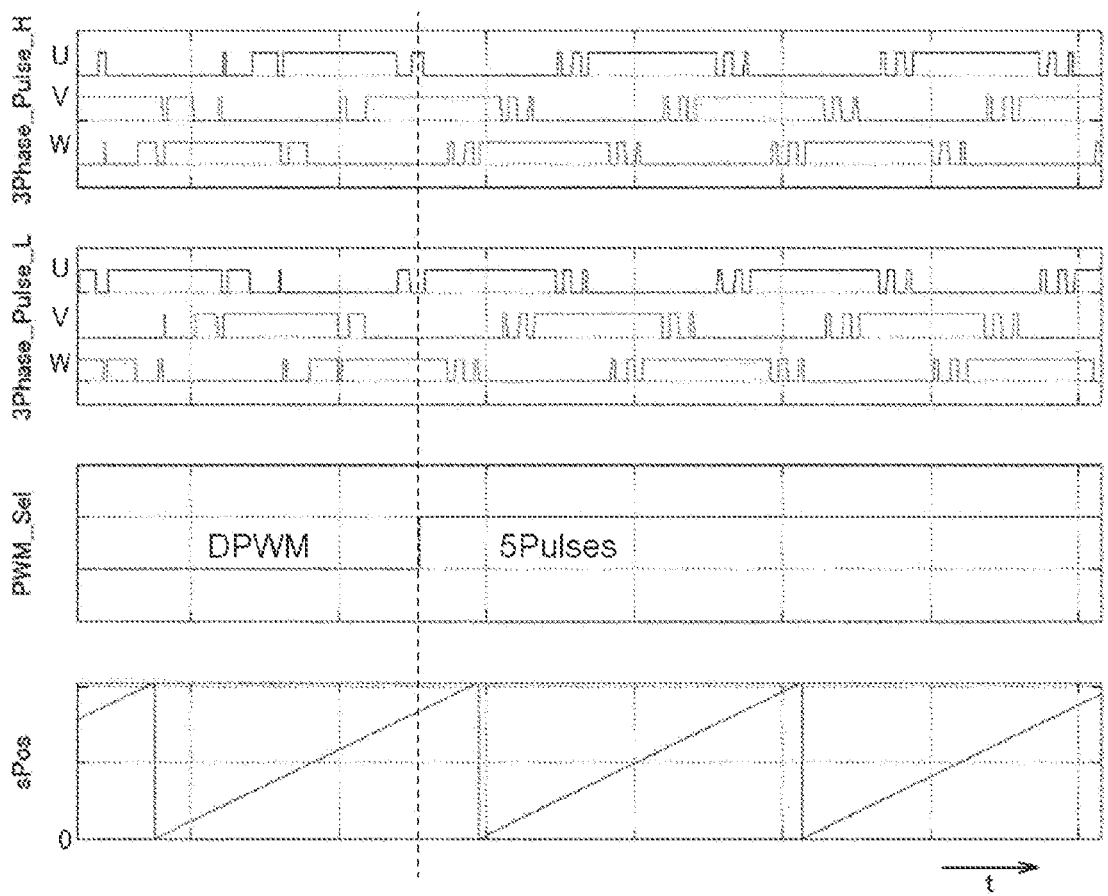
FIG. 18 is waveform charts showing examples of switching pulses when the control system is switched from the asynchronous pulse-width modulation (discontinuous pulse-width modulation) to the synchronous five-pulse control at a relatively high modulation rate (modulation rate higher than in FIG. 19 to be compared).
Figure 19:
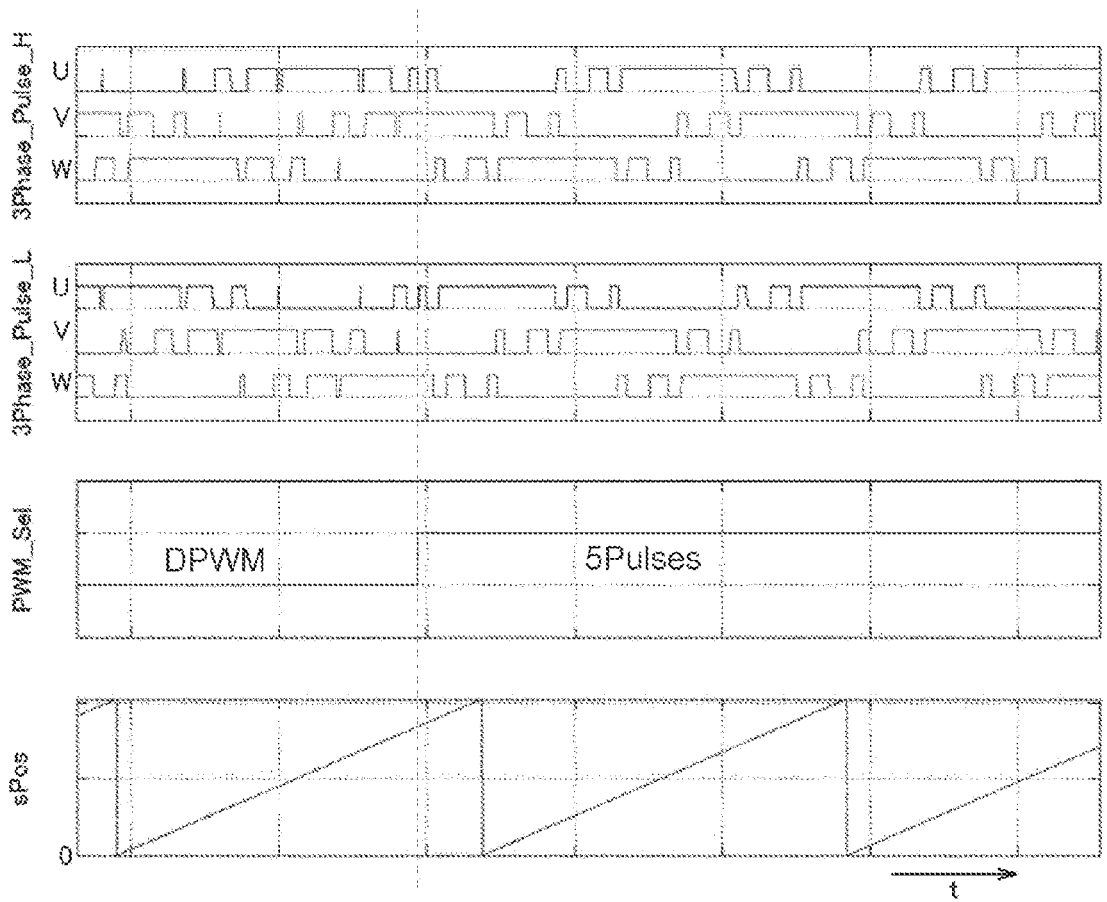
FIG. 19 is waveform charts showing examples of switching pulses when the control system is switched from the asynchronous pulse-width modulation (discontinuous pulse-width modulation) to the synchronous five-pulse control at a relatively low modulation rate (modulation rate lower than in FIG. 18 to be compared).

Hereinafter, the relationship between the numbers of the switching pulses before and after the control system is switched between the asynchronous pulse-modulation and the synchronous five-pulse modulation, and the modulation rate at the time of the switching will be described. FIGS. 16 and 17 illustrate examples in the ascent, and illustrate examples of the switching pulses when the control system is switched from the synchronous five-pulse control to the asynchronous pulse-width modulation (DPWM) at the first boundary K21. In FIG. 17, the control system is switched at a lower modulation rate than in FIG. 16. FIG. 16 illustrates the case where the control system is switched at a modulation rate of 0.7055, while FIG. 17 illustrates the case where the control system is switched at a modulation rate of 0.55. FIGS. 18 and 19 illustrate examples in the descent, and illustrate examples of the switching pulses when the control system is switched from the asynchronous pulse-width modulation (DPWM) to the synchronous five-pulse control at the second boundary K22. In FIG. 18, the control system is switched at a higher modulation rate than in FIG. 19. FIG. 18 illustrates the case where the control system is switched at a modulation rate of 0.7455, while FIG. 19 illustrates the case where the control system is switched at a modulation rate of 0.65.

In FIG. 16, the control system is switched from the synchronous five-pulse control to the asynchronous pulse-width modulation at a high modulation rate and a high rotational speed, and the number of pulses greatly decreases after the switching. Therefore, the three-phase current is disturbed immediately after the control system is switched to causes a jump, and thus current whose maximum value exceeds the overcurrent threshold OV flows as described above with reference to FIG. 5. On the other hand, in FIG. 17, the control system is switched at a lower modulation rate and a lower rotational speed than in FIG. 16, and the number of pulses increases after the switching. Therefore, even immediately after the control system is switched, disturbance of the three-phase current is small, and there is no jump of current that is as large as exceeding the overcurrent threshold OV.

In FIG. 18, the control system is switched from the asynchronous pulse-width modulation to the synchronous five-pulse control at a high modulation rate and a high rotational speed, and the number of pulses increases after the switching. Therefore, even immediately after the control system is switched, disturbance of the three-phase current is small, and there is no jump of current that is as large as exceeding the overcurrent threshold OV In FIG. 19, the control system is switched at a lower modulation rate and a lower rotational speed than in FIG. 18. Therefore, the number of pulses before the switching is larger in FIG. 19 than in FIG. 18. Therefore, in the case of FIG. 19 as compared with FIG. 18, an increase in pulses after the switching is suppressed, and the stability of the three-phase current is lower than in FIG. 18. Therefore, the maximum value of the three-phase current is larger in FIG. 19 than in FIG. 18. Also in the case of FIG. 19, however, there is no jump of current that is as large as exceeding the overcurrent threshold OV.

In the inverter 30, the arm 3A for one AC phase is configured by a series circuit of the upper stage side switching element 3H and the lower stage side switching element 3L, as described above. The switching pulses are provided with a dead time as a period when both the switching control signals (switching pulses) for the upper stage side switching element 3H and lower stage side switching element 3L of the same arm 3A are in a non-effective state so as not to be simultaneously in an effective state that causes the switching element 3 to make a transition to an on-state. Therefore, even if the inverter 30 is controlled by the switching pulses generated according to the designated modulation rate, modulation is performed in which a modulation rate is lower than the designated modulation rate. Therefore, the rotating electrical machine control device 10 can execute dead time compensation for compensating for a decrease in the actual modulation rate due to the dead time with respect to the command value of the modulation rate. For example, the rotating electrical machine control device 10 executes compensation processing in which the command value of the modulation rate is increased by the amount of the dead time such that, in consideration of the dead time in advance, the modulation rate to be output becomes a desired modulation rate.

In the asynchronous pulse-width modulation control in which the switching pulses are generated based on the carrier, an error is likely to occur with change points of the switching pulses, but in the synchronous five-pulse control in which the switching pulses are generated based on a voltage phase, an error is less likely to occur with the change points of the switching pulses. Therefore, in the present embodiment, the dead time is provided in the asynchronous pulse-width modulation control, and the dead time is not provided in the synchronous five-pulse control. That is, the dead time compensation is executed when the operating point is in the PWM region, while the dead time compensation is not executed when the operating point is in the five-pulse region (and one-pulse region).

Here, a case, where the control system is switched from the asynchronous pulse-width modulation control (DPWM control) to the synchronous five-pulse control, is considered. In the asynchronous pulse-width modulation control, the dead time is provided and the dead time compensation is also executed, as described above. On the other hand, in the synchronous five-pulse control, no dead time is provided and no dead time compensation is executed. Therefore, when the control system is switched, the command value of the modulation rate greatly decreases by the amount of the dead time compensation.

Figure 20:
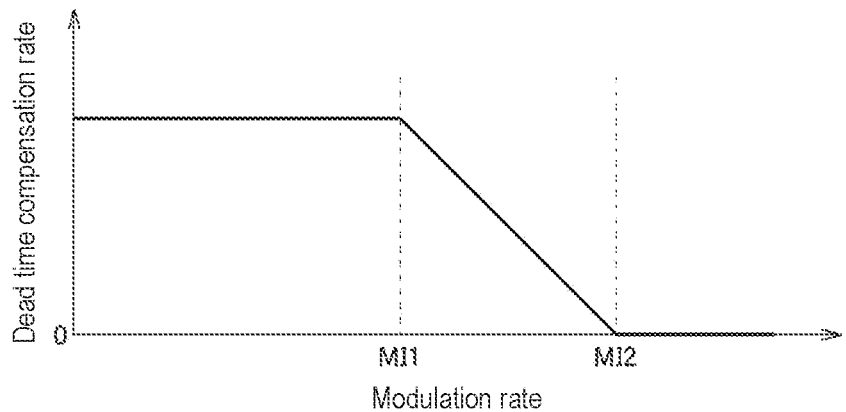
FIG. 20 is a graph showing a relationship between a dead time compensation value and a modulation rate.
Figure 21:
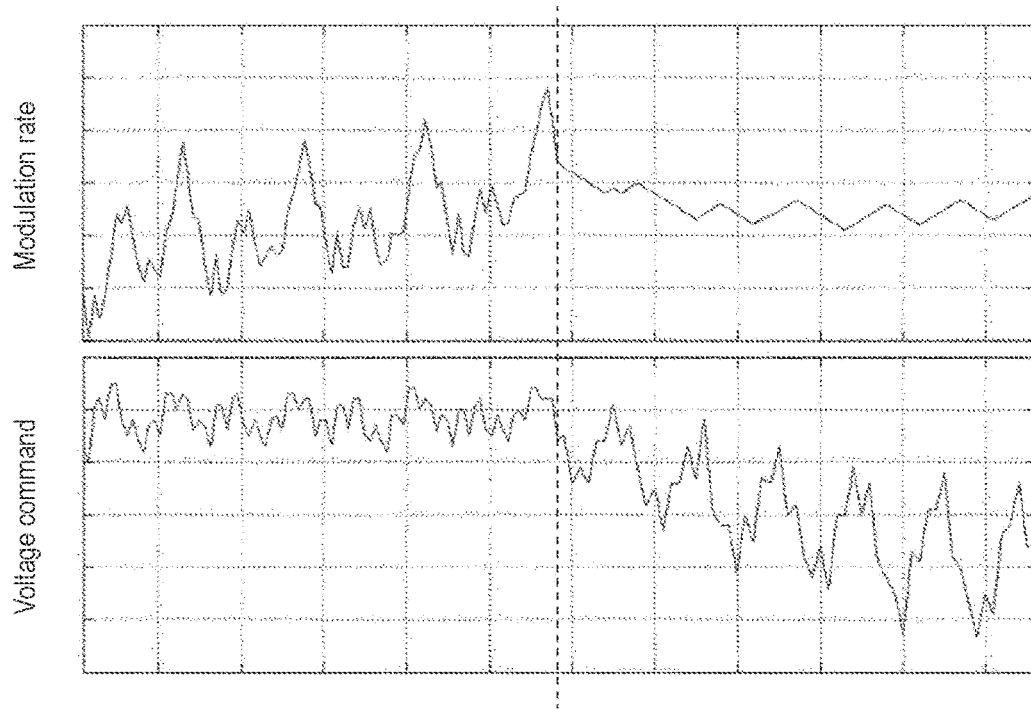
FIG. 21 is waveform charts showing an example in which, when the control system is switched from the asynchronous pulse-width modulation control to the synchronous five-pulse control, the modulation rate decreases by dead time compensation.
Figure 22:
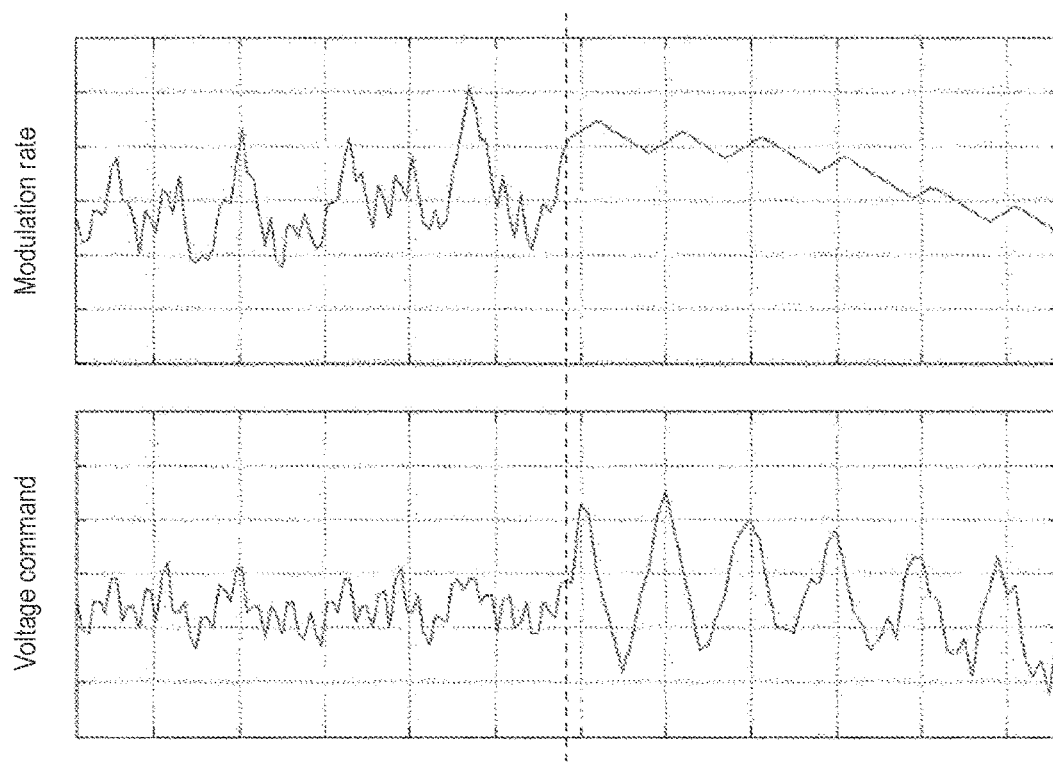
FIG. 22 is waveform charts showing an example in which, when the dead time compensation is not performed and the control system is switched from the asynchronous pulse-width modulation control to the synchronous five-pulse control, the modulation rate does not decrease.

FIG. 21 is waveform charts showing an example in which, when the control system is switched from the asynchronous pulse-width modulation control to the synchronous five-pulse control, the modulation rate decreases by the dead time compensation; FIG. 22 is waveform charts showing an example in which, when the dead time compensation is not performed and the control system is switched from the asynchronous pulse-width modulation control to the synchronous five-pulse control, the modulation rate does not decrease; and FIG. 20 is a graph showing a relationship between the dead time compensation value and the modulation rate. As illustrated in FIG. 21, the modulation rate suddenly decreases with the switching of the control system. As a result, the voltage suddenly changes, and large distortion of the three-phase current occurs. On the other hand, in FIG. 22, a large change is not seen in the modulation rate when the control system is switched. Therefore, a sudden change in the voltage is suppressed, and distortion of the three-phase current is also suppressed.

Here, for example, it is also possible not to perform the dead time compensation in all the regions. However, in such a case, an error becomes large in an operation region where the modulation rate is low, and there is a risk that the accuracy of the control may decrease. Therefore, it is preferable that, for example, a region, where the dead time compensation is limited, is set closer to the first boundary K21 side than to the second boundary K22 even if the operating point is in the PWM region. By providing such a region, a large fluctuation in the modulation rate is suppressed when the control system is switched from the asynchronous pulse-width modulation control to the synchronous five-pulse control, and distortion possibly occurring in the AC current is also suppressed.

Here, the limitation of the dead time compensation may mean that the dead time compensation is not executed, or mean that the compensation value of the dead time compensation is reduced. In addition, from the viewpoint of suppressing a sudden change in the dead time compensation and performing stable control, it is preferable to set, as moving from the first boundary K21 side to the second boundary K22 side, a compensation value in the dead time compensation to gradually become smaller as the modulation rate becomes larger. For example, the compensation value is set, as moving from a first modulation rate MI1 toward a second modulation rate MI2, to gradually become smaller as the modulation rate gradually becomes larger, as illustrated in FIG. 20.

For example, in the operation regions illustrated in FIG. 7, the modulation rate at the first boundary K21 is defined as the first modulation rate MI1, and the modulation rate at the second boundary K22 is defined as the second modulation rate MI2. When the compensation value in the dead time compensation is set as illustrated in FIG. 20, it is possible to suppress a sudden change in the modulation rate when the control system is switched from the asynchronous pulse-width modulation control to the synchronous five-pulse control.

Note that such coping with the dead time compensation is not essential. In a case where distortion of the AC current due to the dead time compensation does not cause a problem, the dead time compensation may not be limited.

As described above, by differentiating the second boundary, at which the control system is switched from the asynchronous pulse-width modulation control to the synchronous five-pulse control, from the first boundary, at which the control system is switched from the synchronous five-pulse control to the asynchronous pulse-width modulation control, it is possible to reduce the difference in the number of pulses of the switching pulses per unit rotational speed before and after the control system is switched. That is, by enlarging the control region, where the synchronous five-pulse control is selected, more than before, the difference in the number of pulses of the switching pulses per unit rotational speed can be reduced before and after the control system is switched. As a result, distortion of the AC current is suppressed as described above, for example, by comparing FIGS. 5 and 9.

Figure 23:
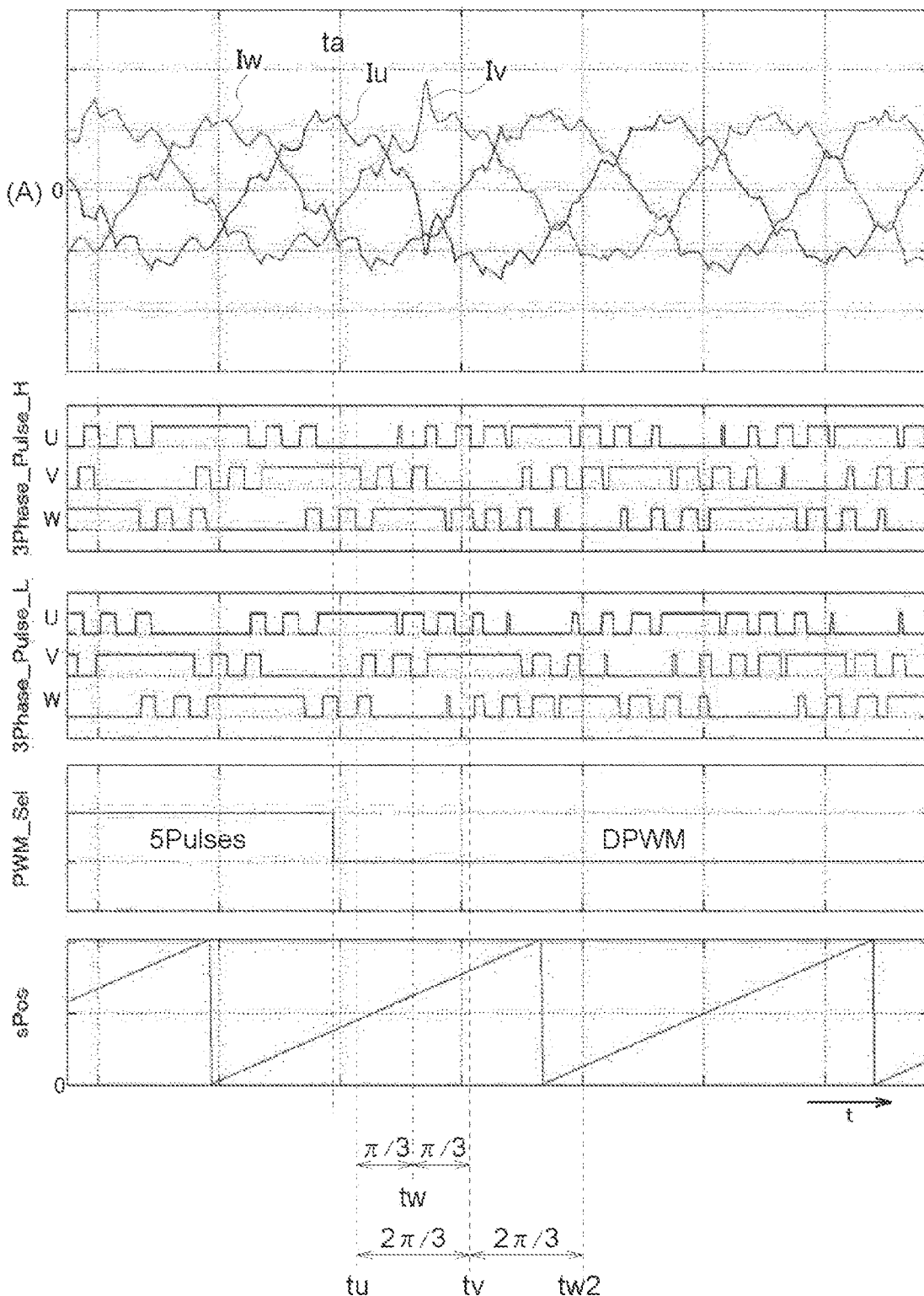
FIG. 23 is waveform charts showing an example in which three-phase switching pulses are switched at delayed times (during regeneration, switching from the synchronous five-pulse control to the asynchronous pulse-width modulation control).

However, when the control system is switched simultaneously for three phases, the balance of the three-phase AC current may be lost. Hereinafter, description will be given with reference to FIGS. 9 and 23. The waveform charts in FIG. 9 illustrate an example in which three-phase switching pulses are simultaneously switched at a mode switching time ta. On the other hand, the waveform charts in FIG. 23 illustrate an example in which three-phase switching pulses are switched at delayed times. FIGS. 9 and 23 both illustrate an example in which, during regeneration, the control system is switched from the synchronous five-pulse control (5 Pulses) to the asynchronous pulse-width modulation control (DPWM) at the first boundary according to the operation regions in FIG. 6. Since the same behavior is performed during power running and regeneration, description will be made by taking during the regeneration as an example.

As described above, the asynchronous pulse-width modulation control is a modulation system that is not synchronized with the rotation of the rotating electrical machine 8, while the synchronous five-pulse control is a modulation system that is synchronized with the rotation of the rotating electrical machine 8. Therefore, the asynchronous pulse-width modulation control and the synchronous five-pulse control are not synchronized with each other. Therefore, the pulse pattern when the control system is switched between both the controls is different each time. Depending on the phase in which the switching occurs, the balance of the three-phase voltage or the three-phase current may be deteriorated. That is, when the control system is switched from the synchronous five-pulse control to the asynchronous pulse-width modulation control at a relatively high modulation rate and a high rotational speed, distortion (current jump) of the three-phase current may occur in both power running and regeneration. As illustrated in FIG. 9, when the switching control signals of all the phases of the U-phase, the V-phase, and the W-phase are simultaneously switched at the mode switching time ta, it can be said that there is room for improvement in the balance of the three-phase AC waveform. Since such distortion of the waveform (disturbance of the balance of the three phases) is caused by the switching of the pulse patterns between modulation systems that are not synchronized with each other, it is preferable that the switching of the pulse patterns accompanying the switching of the control system is executed in a phase in which the three-phase voltage or the three-phase current is stable (described later with reference to FIG. 23).

The asynchronous pulse-width modulation control and the synchronous five-pulse control are modulation systems including a fixed period in which, in a region where the control system is switched between the asynchronous pulse-width modulation control and the synchronous five-pulse control, the switching element 3 is fixed to an on-state or an off-state for each phase of the multiple-phase AC. For example, in the asynchronous pulse-width modulation control, the DPWM is being executed, and the DPWM is a modulation system including the fixed period. The synchronous five-pulse control is also a modulation system including the fixed period, as described above with reference to FIGS. 13 to 15. The rotating electrical machine control device 10 may switch the control system in the fixed period in the control system after being switched to. Since the fixed period is set in a different phase for each phase, it is preferable to switch the control system for each phase of the multiple-phase AC at a region boundary between the five-pulse region and the PWM region.

In addition, the fixed periods in the respective phases are evenly arranged in one cycle of the electrical angle, and thus, when the multiple phases are N (N is a natural number of 2 or more) phases, the control system in each phase may be switched by differentiating by every $\pi/N$ or $2\pi/N$ in terms of the electrical angle. In the case of the three-phase AC as in the present embodiment, it is preferable that the control system is switched for each phase of the three phases, that is, by every "$\pi/3$" (=60 [deg]) or every "$2\pi/32$" (=120 [deg]).

As described above, FIG. 9 illustrates an example in which the three-phase switching pulses are simultaneously switched at the mode switching time ta. On the other hand, FIG. 23 illustrates an example in which the three-phase switching pulses are switched by differentiating by every "$\pi/3$". With reference to FIG. 9, for example, the V-phase switching pulse is not stable at the mode switching time ta, and the U-phase switching pulse also has a long Hi period. That is, the balance of the three-phase switching pulses is lost. As a result, the amplitude of the W-phase current becomes larger than in the currents of the other two phases, and the balance of the three-phase currents is disturbed. On the other hand, with reference to FIG. 23, none of the three-phase switching pulses is switched when the control system is switched (mode switching time ta), and thereafter, the U-phase switching pulse, which reaches the fixed period earliest, is switched at a time tu. Thereafter, the W-phase switching pulse is switched at a time tw after "$\pi/3$" from the time tu, and the V-phase switching pulse is switched at a time tv further after "$\pi/3$" therefrom.

In the example of FIG. 23, the form, in which the switching pulses of the respective phases are switched by differentiating by every "π/3", has been described as an example, but the switching pulses of the respective phases may be switched by differentiating by every "2π/3". In this case, the U-phase switching pulse, which reaches the fixed period earliest after the control system is switched, is switched at the time tu, and then the V-phase switching pulse is switched at the time tv after "2π/3" from the time tu. Then, the W-phase switching pulse is switched at a time tw2 further after "2π/3" therefrom.

For example, the fixed periods when the switching elements 3 are fixed to an on-state appear for "π/3" in the order of the U-phase upper stage, the W-phase lower stage, the V-phase upper stage, the U-phase lower stage, the W-phase upper stage, and the V-phase lower stage. Since the switching of the control system is not synchronized with the switching patterns, a phase, in which the fixed period appears first after the control system is switched, is different each time. The rotating electrical machine control device 10 switches the switching pulse of a phase, which reaches the fixed period earliest after a control system is switched, to the switching pulse in a control system after being switched to, and then sequentially switches, every "π/3" or "2π/3", the switching pulses of the other phases to the switching pulses in the control system after being switched to. In a case where the switching is performed only for the upper stage side or only for the lower stage side, the switching may be performed every "2π/3". Although the case, where the multiple-phase AC is three-phase AC, has been described here as an example, it may be sufficient that, when multiple phases are N (N is a natural number of 2 or more) phases, the control system in each phase may be switched by differentiating by every π/N or 2π/N in terms of the electrical angle.

In a case where the switching pulse is switched in the fixed period as described above, the current and voltage in the phase are relatively stable. Therefore, the switching pulse may be switched based on the current or the voltage, not based on the switching pulse. The control system may be switched, for example, at a time point when the voltage waveform of each of the multiple-phase AC intersects with an amplitude center. The time point, when the voltage waveform of each of the multiple-phase AC intersects with an amplitude center, is not a time point when the AC voltage matches an amplitude center, but may be a period when the AC voltage has a voltage value within approximately 10% of the rated maximum amplitude. As a matter of course, the switching time of switching pulse (pulse switching time: tu, tv, tw, tw2, or the like) set within the fixed period in this manner may be the same time as the mode switching time ta as long as conditions are satisfied.

In many cases, the rotating electrical machine control device 10 includes an electronic circuit having a microcomputer as a core. In many cases, a pattern of a switching pulse is stored in a storage device, such as a memory, in advance, and the switching pulse is read from the memory and output using a direct memory access (DMA) controller or the like built in the microcomputer. When the microcomputer includes only one DMA controller, it is difficult to output the switching control signals of the respective phases at different timings as described above. However, in a case where a plurality of DMA controllers are mounted in one microcomputer, for example, in a case where three DMA controllers are mounted, each DMA controller can be allocated for outputting the switching pulse of each phase. In such a case, the switching patterns can be easily switched at different timings. Even if the microcomputer includes a plurality of DMA controllers, the DMA controllers are often unused. However, when such DMA controllers are also effectively utilized, the control system can be switched more smoothly.

As described above, when the rotating electrical machine control device 10 switches the control system in the fixed period in the control system after being switched to or at time point when the voltage waveform of each of the multiple-phase AC intersects with an amplitude center, and when, in a case where the multiple phases are N (N is a natural number of 2 or more) phases, the rotating electrical machine control device 10 switches the switching pulses in the respective phases by differentiating by every π/N or 2π/N in terms of the electrical angle, distortion of the current, when the control system is switched, can be further suppressed.

As a matter of course, the switching pulses in the respective phases may be switched at the same timing in a case where the distortion of the current, when the control system is switched, is acceptable or according to the specification of a microcomputer that is to be a core of the rotating electrical machine control device 10, or the like.

In the above description, it has been described that, (A) by differentiating the second boundary, at which the control system is switched from the asynchronous pulse-width modulation control to the synchronous five-pulse control, from the first boundary, at which the control system is switched from the synchronous five-pulse control to the asynchronous pulse-width modulation control, and by enlarging a control region, where the synchronous five-pulse control is selected, more than before: and (B) by differentiating the switching timings, when the switching pulses are switched, for each phase, it is possible, when the control system is switched between the asynchronous pulse-width modulation control and the synchronous five-pulse control, to suppress distortions of voltage and current to be small and smoothly switch the control system. Here, (A) and (B) may be performed independently, or both (A) and (B) may be performed together.

Outline of Embodiment

Hereinafter, an outline of the rotating electrical machine control device (10) described above will be briefly described.

In one aspect, a rotating electrical machine control device (10), which drives and controls a rotating electrical machine (8) by performing switching control of a plurality of switching elements (3) constituting an inverter (30) that is connected to a DC power supply (4) and is connected to the rotating electrical machine (8) to convert power between DC and multiple-phase AC, includes at least asynchronous pulse-width modulation control and synchronous five-pulse control as control systems of the inverter (30), the asynchronous pulse-width modulation control being a control system in which the switching elements (3) are controlled by a plurality of switching pulses output based on a carrier that is not synchronized with rotation of the rotating electrical machine (8), the synchronous five-pulse control being a control system in which the switching elements (3) are controlled by the switching pulses output five times in one cycle of an electrical angle in synchronization with the rotation of the rotating electrical machine (8), and the control system of the inverter (30) being selected based on an operation region set by a relationship between a torque and rotational speed of the rotating electrical machine (8), in which: a five-pulse region, which is an operation region where the synchronous five-pulse control is selected, is set on a side where the rotational speed of the rotating electrical machine (8) is higher and the torque is larger than in a PWM region, which is an operation region where the asynchronous pulse-width modulation control is selected; a region boundary between the five-pulse region and the PWM region has a first boundary (K21) and a second boundary (K22); the second boundary (K22) is set on a side where the rotational speed of the rotating electrical machine (8) is higher and the torque is larger than at the first boundary (K21); when an operating point determined by a relationship between the torque and rotational speed of the rotating electrical machine (8) changes from a state in which the asynchronous pulse-width modulation control is being executed, and crosses the second boundary (K22), the control system is shifted from the asynchronous pulse-width modulation control to the synchronous five-pulse control: when the operating point changes from a state in which the synchronous five-pulse control is being executed, and crosses the first boundary (K21), the control system is shifted from the synchronous five-pulse control to the asynchronous pulse-width modulation control; the second boundary (K22) is set such that the number of the switching pulses per unit rotational speed by the asynchronous pulse-width modulation control immediately before the operating point crosses the second boundary (K22) is smaller than the number of the switching pulses per the unit rotational speed by the synchronous five-pulse control immediately after the operating point crosses the second boundary (K22); and the first boundary (K21) is set such that the number of the switching pulses per the unit rotational speed by the synchronous five-pulse control immediately before the operating point crosses the first boundary (K21) is smaller than the number of the switching pulses per the unit rotational speed by the asynchronous pulse-width modulation control immediately after the operating point crosses the first boundary (K21).

According to this configuration, by differentiating the second boundary (K22), at which the control system is switched from the asynchronous pulse-width modulation control to the synchronous five-pulse control, from the first boundary (K21), at which the control system is switched from the synchronous five-pulse control to the asynchronous pulse-width modulation control, it is possible to provide hysteresis between when the control system is switched at both the boundaries. Furthermore, this hysteresis makes it possible to reduce a difference in the number of the switching pulses per unit rotational speed before and after the control system is switched. As a result, distortion of AC current is suppressed. Specifically, the second boundary (K22) is set such that, when the operating point moves from the first boundary (K21) side to the second boundary (K22) side, the number of the switching pulses per unit rotational speed by the asynchronous pulse-width modulation control immediately before the operating point crosses the second boundary (K22) is smaller than the number of the switching pulses per unit rotational speed by the synchronous five-pulse control immediately after the operating point crosses the first boundary (K21). That is, when the control system is switched, a state in which the number of pulses is small is changed to a state in which the number of pulses is large, so that stable switching is realized. The first boundary (K21) is set such that, when the operating point moves from the second boundary (K22) side to the first boundary (K21) side, the number of the switching pulses per unit rotational speed by the synchronous five-pulse control immediately before the operating point crosses the first boundary (K21) is smaller than the number of the switching pulses per unit rotational speed by the asynchronous pulse-width modulation control immediately after the operating point crosses the first boundary (K21). As a result, when the control system is switched, a state in which the number of pulses is small is changed to a state in which the number of pulses is large, so that stable switching is realized. According to the present configuration, in the control of an inverter (30) that converts power between DC and multiple-phase AC, it is possible, when the control system is switched between the asynchronous pulse-width modulation control and the synchronous five-pulse control, to suppress distortions of voltage and current to be small and smoothly switch the control system, as described above.

In another aspect, a rotating electrical machine control device (10), which drives and controls a rotating electrical machine (8) by performing switching control of a plurality of switching elements (3) constituting an inverter (30) that is connected to a DC power supply (4) and is connected to the rotating electrical machine (8) to convert power between DC and multiple-phase AC, includes at least asynchronous pulse-width modulation control and synchronous five-pulse control as control systems of the inverter (30), the asynchronous pulse-width modulation control being a control system in which the switching elements (3) are controlled by a plurality of switching pulses output based on a carrier that is not synchronized with rotation of the rotating electrical machine (8), the synchronous five-pulse control being a control system in which the switching elements (3) are controlled by the switching pulses output five times in one cycle of an electrical angle in synchronization with the rotation of the rotating electrical machine (8), and, based on operation regions set by a relationship between torque and a rotational speed of the rotating electrical machine (8), the control system of the inverter (30) being selected, in which: a five-pulse region, which is an operation region where the synchronous five-pulse control is selected, is set on a side where the rotational speed of the rotating electrical machine (8) is higher and the torque is larger than in a PWM region, which is an operation region where the asynchronous pulse-width modulation control is selected; the control system is switched for each phase of the multiple-phase AC at a region boundary between the five-pulse region and the PWM region; the asynchronous pulse-width modulation control and the synchronous five-pulse control at the region boundary are modulation systems including a fixed period ($\theta f$) in which the switching element (3) is fixed to an on-state or an off-state for each phase of the multiple-phase AC: the control system is switched in the fixed period ($\theta f$) in the control system after being switched to or at a time point when a voltage waveform of each of the multiple-phase AC intersects with an amplitude center; and, in a case where the multiple phases are N (N is a natural number of 2 or more) phases, the switching of the control system in each phase is performed by differentiating by every $\pi/N$ or $2\pi/N$ in terms of the electrical angle, and the switching pulse is switched.

The asynchronous pulse-width modulation control is a modulation system that is not synchronized with the rotation of the rotating electrical machine (8), while the synchronous five-pulse control is a modulation system that is synchronized with the rotation of the rotating electrical machine (8). Therefore, the switching pulse by the asynchronous pulse-width modulation control and the switching pulse by the synchronous five-pulse control are not synchronized with each other. Therefore, when the control system is switched between both the controls, the switching pulse may be disconnected or the pulse-width may be greatly increased or decreased depending on a phase in which the switching occurs. Such a phenomenon may occur only in some phases, and in that case, the balance of the multiple-phase switching pulses may be lost, and as a result, the balance of the multiple-phase AC voltages or AC currents may be deteriorated. For example, when the switching pulse is switched in the fixed period ($\theta f$), the current and voltage in the phase are relatively stable. When the rotating electrical machine control device (10) switches the switching pulse at the timing as in the present configuration, distortions of current and voltage caused by the switching of the switching pulse are suppressed, and disturbance of the balance of the multiple-phase AC current and AC voltage is also suppressed. That is, according to the present configuration, in the control of the inverter (30) that converts power between DC and multiple-phase AC, it is possible, when the control system is switched between the asynchronous pulse-width modulation control and the synchronous five-pulse control, to suppress distortions of voltage and current to be small and smoothly switch the control system.

Here, it is preferable that the first boundary (K21) and the second boundary (K22) are set such that, as a DC link voltage (Vdc), which is a voltage on the DC side of the inverter (30), becomes higher, the interval between the first boundary (K21) and the second boundary (K22) becomes longer.

The higher the DC link voltage (Vdc), the lower the modulation rate when the same torque is output at the same rotational speed. Therefore, for example, when the second boundary (K22) is set such that the modulation rates are substantially the same in a case w % here the DC link voltages (Vdc) are different, the second boundary (K22) is set on a higher rotational speed side as the DC link voltage (Vdc) becomes higher. Here, for example, when the first boundary (K21) is set to the same rotational speed regardless of the DC link voltage (Vdc), the modulation rate at the first boundary (K21) becomes lower as the DC link voltage (Vdc) becomes higher. Therefore, the interval between the first boundary (K21) and the second boundary (K22) becomes longer as the DC link voltage (Vdc) becomes higher. At this time, the modulation rate at the first boundary (K21) becomes lower as the DC link voltage (Vdc) becomes higher, and becomes higher as the DC link voltage (Vdc) becomes lower. Since the rotational speed of the rotating electrical machine (8), when the control system is switched from the synchronous five-pulse control to the asynchronous pulse-width modulation control, is substantially constant even when the DC link voltage (Vdc) is different, the synchronous five-pulse control can be stably executed by a higher modulation rate particularly when the DC link voltage (Vdc) is low. As a result, the control system can be switched to the asynchronous pulse-width modulation control in a state in which an increase in current, in a steady state in which the synchronous five-pulse control is being executed, is suppressed.

In the inverter (30), an arm (3A) for one AC phase is configured by a series circuit of an upper stage side switching element (3H) and a lower stage side switching element (3L), and it is preferable that: in order not to cause the switching pulse for the upper stage side switching element (3H) and the switching pulse for the lower stage side switching element (3L) of the same arm (3A) to be simultaneously in an effective state that causes the switching element (3) to make a transition to an on-state, a dead time, when both the switching pulses are in a non-effective state, is provided, and dead time compensation, for compensating for a decrease in the actual modulation rate due to the dead time with respect to the command value of a modulation rate indicating a power conversion rate between DC and AC, can be executed; the dead time compensation is executed when the operating point is in the PWM region, while the dead time compensation is not executed when the operating point is in the five-pulse region; and a region, where the dead time compensation is not executed even when the operating point is in the PWM region, is set closer to the first boundary (K21) than to the second boundary (K22).

For example, in a case where the dead time compensation is performed in none of the regions, an error increases in an operation region having a low modulation rate, and there is a risk that the accuracy of the control may decrease. As described above, when a region, where the dead time compensation is limited even if the operating point is in the PWM region, is set, a large fluctuation in the modulation rate is suppressed when the control system is switched from the asynchronous pulse-width modulation control to the synchronous five-pulse control, and distortion possibly occurring in the AC current is also suppressed.

When the dead time compensation can be executable, it is preferable to set, as moving from the first boundary (K21) side to the second boundary (K22) side, a compensation value in the dead time compensation to gradually become smaller as the modulation rate becomes larger.

According to this configuration, it is possible to suppress a sudden change in the modulation rate when the control system is switched from the asynchronous pulse-width modulation control to the synchronous five-pulse control.

REFERENCE SIGNS LIST

1: Synchronization, 3: Switching element, 3A: Arm, 3H: Upper stage side switching element, 3L: Lower stage side switching element, 4: DC power supply, 8: Rotating electrical machine, 10: Rotating electrical machine control device, 30: Inverter; K21: First boundary, K22: Second boundary, Vdc: DC link voltage, and $\theta f$: Fixed period

The invention claimed is:

1. A rotating electrical machine control device, which drives and controls a rotating electrical machine by performing switching control of a plurality of switching elements constituting an inverter that is connected to a DC power supply and is connected to the rotating electrical machine to convert power between DC and multiple-phase AC, and comprises at least asynchronous pulse-width modulation control and synchronous five-pulse control as control systems of the inverter, the asynchronous pulse-width modulation control being a control system in which the switching elements are controlled by a plurality of switching pulses output based on a carrier that is not synchronized with rotation of the rotating electrical machine, the synchronous five-pulse control being a control system in which the switching elements are controlled by the switching pulses output five times in one cycle of an electrical angle in synchronization with the rotation of the rotating electrical machine, and based on operation regions set by a relationship between torque and a rotational speed of the rotating electrical machine, the control system of the inverter being selected, wherein a five-pulse region, which is an operation region where the synchronous five-pulse control is selected, is set on a side where the rotational speed of the rotating electrical machine is higher and the torque is larger than in a PWM region, which is an operation region where the asynchronous pulse-width modulation control is selected, a region boundary between the five-pulse region and the PWM region has a first boundary and a second boundary, the second boundary is set on a side where the rotational speed of the rotating electrical machine is higher and the torque is larger than at the first boundary, when an operating point defined by the relationship between the torque and rotational speed of the rotating electrical machine changes from a state in which the asynchronous pulse-width modulation control is being executed, and crosses the second boundary, the control system is shifted from the asynchronous pulse-width modulation control to the synchronous five-pulse control, when the operating point changes from a state in which the synchronous five-pulse control is being executed, and crosses the first boundary, the control system is shifted from the synchronous five-pulse control to the asynchronous pulse-width modulation control, the second boundary is set such that the number of the switching pulses per unit rotational speed by the asynchronous pulse-width modulation control immediately before the operating point crosses the second boundary is smaller than the number of the switching pulses per the unit rotational speed by the synchronous five-pulse control immediately after the operating point crosses the second boundary, and the first boundary is set such that the number of the switching pulses per the unit rotational speed by the synchronous five-pulse control immediately before the operating point crosses the first boundary is smaller than the number of the switching pulses per the unit rotational speed by the asynchronous pulse-width modulation control immediately after the operating point crosses the first boundary.

2. The rotating electrical machine control device according to claim 1, wherein the first boundary and the second boundary are set such that an interval between the first boundary and the second boundary becomes longer as a DC link voltage, which is a voltage on a DC side of the inverter, becomes higher.

3. The rotating electrical machine control device according to claim 1, wherein in the inverter, an arm for one AC phase is configured by a series circuit of an upper stage side switching element and a lower stage side switching element, in order not to cause the switching pulse for the upper stage side switching element and the switching pulse for the lower stage side switching element of the same arm to be simultaneously in an effective state that causes the switching element to make a transition to an on-state, a dead time, when both the switching pulses are in a non-effective state, is provided, and dead time compensation, for compensating for a decrease in an actual modulation rate due to the dead time with respect to a command value of a modulation rate indicating a power conversion rate between DC and AC, can be executed, the dead time compensation is executed when the operating point is in the PWM region, while the dead time compensation is not executed when the operating point is in the five-pulse region, and a region, where the dead time compensation is not executed even when the operating point is the PWM region, is set closer to the first boundary than to the second boundary.

4. The rotating electrical machine control device according to claim 3, wherein a compensation value in the dead time compensation is set, as moving from the first boundary side to the second boundary side, to gradually become smaller as the modulation rate becomes larger.

5. The rotating electrical machine control device according to claim 2, wherein in the inverter, an arm for one AC phase is configured by a series circuit of an upper stage side switching element and a lower stage side switching element, in order not to cause the switching pulse for the upper stage side switching element and the switching pulse for the lower stage side switching element of the same arm to be simultaneously in an effective state that causes the switching element to make a transition to an on-state, a dead time, when both the switching pulses are in a non-effective state, is provided, and dead time compensation, for compensating for a decrease in an actual modulation rate due to the dead time with respect to a command value of a modulation rate indicating a power conversion rate between DC and AC, can be executed, the dead time compensation is executed when the operating point is in the PWM region, while the dead time compensation is not executed when the operating point is in the five-pulse region, and a region, where the dead time compensation is not executed even when the operating point is the PWM region, is set closer to the first boundary than to the second boundary.

6. A rotating electrical machine control device, which drives and controls a rotating electrical machine by performing switching control of a plurality of switching elements constituting an inverter that is connected to a DC power supply and is connected to the rotating electrical machine to convert power between DC and multiple-phase AC, and comprises at least asynchronous pulse-width modulation control and synchronous five-pulse control as control systems of the inverter, the asynchronous pulse-width modulation control being a control system in which the switching elements are controlled by a plurality of switching pulses output based on a carrier that is not synchronized with rotation of the rotating electrical machine, the synchronous five-pulse control being a control system in which the switching elements are controlled by the switching pulses output five times in one cycle of an electrical angle in synchronization with the rotation of the rotating electrical machine, and based on operation regions set by a relationship between torque and a rotational speed of the rotating electrical machine, the control system of the inverter being selected, wherein a five-pulse region, which is an operation region where the synchronous five-pulse control is selected, is set on a side where the rotational speed of the rotating electrical machine is higher and the torque is large than in a PWM region, which is an operation region where the asynchronous pulse-width modulation control is selected, the control system is switched for each phase of the multiple-phase AC at a region boundary between the five-pulse region and the PWM region, the asynchronous pulse-width modulation control and the synchronous five-pulse control at the region boundary are modulation systems including a fixed period in which the switching element is fixed to an on-state or an off-state for each phase of the multiple-phase AC, the control system is switched in the fixed period in the control system after being switched to or at a time point when a voltage waveform of each of the multiple-phase AC intersects with an amplitude center, and in a case where the multiple phases are N phases, with N being a natural number of 2 or more, the switching of the control system in each phase is performed by differentiating by every $\pi/N$ or $2\pi/N$ in terms of an electrical angle, and the switching pulse is switched.

* * * * *